United States Patent
Chilumukuru et al.

(10) Patent No.: US 11,808,683 B2
(45) Date of Patent: **\*Nov. 7, 2023**

(54) SYSTEMS AND METHODS FOR INSPECTING PARTICULATE FILTERS

(71) Applicant: CUMMINS INC., Columbus, IN (US)

(72) Inventors: Krishna Pradeep Chilumukuru, Columbus, IN (US); James C. Clerc, Columbus, IN (US); Richard Adotey Allotey, Savannah, GA (US); Luis Fernando Loo Zazueta, San Luis Potosi (MX); Todd M. Wieland, Columbus, IN (US); Rafael Ernesto Vasquez Lombardo, Columbus, IN (US)

(73) Assignee: Cummins Inc., Columbus, IN (US)

( * ) Notice: Subject to any disclaimer, the term of this patent is extended or adjusted under 35 U.S.C. 154(b) by 11 days.

This patent is subject to a terminal disclaimer.

(21) Appl. No.: 17/572,953

(22) Filed: Jan. 11, 2022

(65) Prior Publication Data

US 2022/0128448 A1  Apr. 28, 2022

Related U.S. Application Data

(63) Continuation of application No. 16/725,018, filed on Dec. 23, 2019, now Pat. No. 11,226,277.
(Continued)

(51) Int. Cl.
*G01N 15/08* (2006.01)
*B01D 46/00* (2022.01)

(52) U.S. Cl.
CPC ... *G01N 15/0826* (2013.01); *G01N 2015/084* (2013.01)

(58) Field of Classification Search
CPC .... G01N 15/00; G01N 15/08; G01N 15/0826; G01N 2015/084; B01D 46/00–54
See application file for complete search history.

(56) References Cited

U.S. PATENT DOCUMENTS

| 7,419,532 B2 | 9/2008 | Sellers et al. |
| 8,048,207 B1 | 11/2011 | Streichsbier et al. |
| (Continued) | | |

FOREIGN PATENT DOCUMENTS

| CN | 104111144 | 10/2014 |
| CN | 104975922 | 10/2015 |
| (Continued) | | |

OTHER PUBLICATIONS

"Cambustion service for Diesel Particulate Filter performance testing," Cambustion Limited, 7 pages.
(Continued)

*Primary Examiner* — Nguyen Q. Ha
(74) *Attorney, Agent, or Firm* — Foley & Lardner LLP

(57) ABSTRACT

A particulate filter inspection system for a particulate filter includes a compressed air source, a primary conduit, a controller, a probe, and a gauge. The compressed air source is configured to draw air from an air source. The primary conduit is configured to receive the air from the compressed air source. The probe is coupled to the primary conduit and communicable with the controller. The probe is configured to interface with a face of the particulate filter to provide the air to only a sector of the particulate filter. The gauge is configured to determine a pressure of the air within the primary conduit when the probe is providing air to only a sector of the face of the particulate filter. The controller is configured to receive the pressure from the gauge, compare the pressure to a target upper pressure, and provide an (Continued)

indication that the particulate filter is dirty if the pressure is not lower than the target upper pressure.

20 Claims, 11 Drawing Sheets

Related U.S. Application Data

(60) Provisional application No. 62/788,034, filed on Jan. 3, 2019.

(56) References Cited

U.S. PATENT DOCUMENTS

| | | | |
|---|---|---|---|
| 8,549,895 | B2 | 10/2013 | Chung et al. |
| 8,832,957 | B2 | 9/2014 | Meister |
| 11,226,277 | B2 * | 1/2022 | Chilumukuru ..... G01N 15/0826 |
| 2009/0223293 | A1 | 9/2009 | Owens |
| 2016/0097706 | A1 | 4/2016 | Woolard et al. |
| 2018/0209890 | A1 | 7/2018 | Case et al. |
| 2020/0292405 | A1 | 9/2020 | Petersen |

FOREIGN PATENT DOCUMENTS

| | | |
|---|---|---|
| CN | 105443214 | 3/2016 |
| CN | 105604650 | 5/2016 |
| CN | 106257007 | 12/2016 |
| EP | 1 251 344 | 10/2002 |
| JP | H10-296025 | 11/1998 |
| JP | 2002-243626 | 8/2002 |
| TW | 201116817 | 5/2011 |
| WO | WO-2009/023474 A1 | 2/2009 |
| WO | WO-2018/050553 A1 | 3/2018 |
| WO | WO-2018/194986 | 10/2018 |

OTHER PUBLICATIONS

"Diesel particulate filter," Wikipedia, 7 pages, accessed Oct. 5, 2018.
"DPF Filter Cleaning Concerns," California Air Resources Board, 7 pages.
"EZ Flow System," Performance Trends, Inc., 8 pages, accessed Oct. 5, 2018.
"FSXTrapTester Air Flow Test Bench," FSX Equipment Inc., 6 pages, accessed Oct. 5, 2018.
Notice of Allowance for U.S. Appl. No. 16/725,018, dated Oct. 13, 2021.
Office Action for CN Application No. 2019111466883, dated Sep. 1, 2021.
Office Action for IN Patent Application No. 201944042288, dated Jun. 1, 2021.
U.S. Office Action for U.S. Appl. No. 16/725,018, dated Jun. 25, 2021.

* cited by examiner

SYSTEMS AND METHODS FOR INSPECTING PARTICULATE FILTERS

CROSS-REFERENCE TO RELATED PATENT APPLICATION

The present application is a continuation of U.S. patent application Ser. No. 16/725,018, filed Dec. 23, 2019, which claims priority to U.S. Provisional Patent Application No. 62/788,034, filed Jan. 3, 2019, the contents of which are incorporated herein by reference in their entirety.

TECHNICAL FIELD

The present application relates generally to systems and methods for inspecting particulate filters used in an aftertreatment system associated with an internal combustion engine system.

BACKGROUND

Internal combustion engines produce exhaust gas. Internal combustion engines may include aftertreatment systems that treat exhaust gas so as to reduce emission of undesirable compounds to atmosphere. Aftertreatment systems may include particulate filters that function to remove particulates from exhaust gas. A particulate filter may require routine cleaning to remove particulates, as well as routine inspection to ensure that a level of particulates within the particulate filter is maintained within a desirable range. If the level of particulates in a particulate filter is not within the desirable range, the particulate filter may not desirably remove particulates from exhaust gas and/or an internal combustion engine system associated with the particulate filter may not operate desirably (e.g., due to increased back pressure provided by the particulate filter, etc.).

Currently, particulate filters are usually inspected using an air flow test bench. An air flow test bench may include a hole over which a particulate filter may be placed. Thereafter, the air flow test bench may be turned on, causing flow through the particulate filter and facilitating acquisition of a flow rate measurement. An operator may then use this flow rate measurement to determine whether a flow rate through the particulate filter is within a desirable range associated with a desirable range of particulates, and therefore whether the particulate filter needs to be replaced.

Flow rate measurements are obtained using a path of least resistance through the particulate filter. As a result, flow rate measurements may not accurately convey the level of particulates within a particulate filter because particulates may be contained within the particulate filter that does not substantially impact the path of least resistance through the particulate filter. Accordingly, air flow test benches are undesirable for performing inspection of particulate filters.

SUMMARY

In one embodiment, a particulate filter inspection system for a particulate filter includes a compressed air source, a primary conduit, a controller, a probe, and a gauge. The compressed air source is configured to draw air from an air source. The primary conduit is configured to receive the air from the compressed air source. The probe is coupled to the primary conduit and communicable with the controller. The probe is configured to interface with a face of the particulate filter to provide the air to only a sector of the particulate filter. The gauge is configured to determine a pressure of the air within the primary conduit when the probe is providing the air to only a sector of the face of the particulate filter. The controller is configured to receive the pressure from the gauge, compare the pressure to a target upper pressure, and provide an indication that the particulate filter is dirty if the pressure is not lower than the target upper pressure.

In another embodiment, a method of testing a particulate filter using a particulate filter inspection system including a probe and a gauge includes determining a target sector of a face of the particulate filter. The method also includes locating the probe on the target sector. The method also includes receiving a pressure for the target sector from the gauge. The method also includes determining if the pressure is lower than a target upper pressure associated with the target sector. The method also includes increasing a plugged sector count in response to determining that the pressure is not lower than the target upper pressure.

In yet another embodiment, a method of testing a particulate filter using a particulate filter inspection system including a probe, a gauge, a compressed air source, and a controller communicable with the gauge and the compressed air source includes determining a target sector of a face of the particulate filter. The method also includes locating the probe on the target sector. The method also includes receiving, by the controller, a pressure for the target sector from the gauge. The method also includes determining, by the controller, if the pressure is lower than a target upper pressure associated with the target sector. The method also includes increasing, by the controller, a plugged sector count in response to determining that the pressure is not lower than the target upper pressure.

In yet another embodiment, a particulate filter inspection system for a particulate filter includes a compressed air source, a primary conduit, a controller, a probe, a gauge, and an auxiliary conduit. The compressed air source is configured to draw air from an air source. The primary conduit is configured to receive the air from the compressed air source. The probe is coupled to the primary conduit and communicable with the controller. The probe is configured to interface with a face of the particulate filter to provide the air to only a sector of the particulate filter. The gauge is configured to determine a pressure of the air within the probe when the probe is providing air to only a sector of the face of the particulate filter. The auxiliary conduit is coupled to the gauge and the probe. The auxiliary conduit separates the gauge from the probe. The controller is configured to receive the pressure from the gauge, compare the pressure to a target upper pressure, and provide an indication that the particulate filter is dirty if the pressure is not lower than the target upper pressure.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
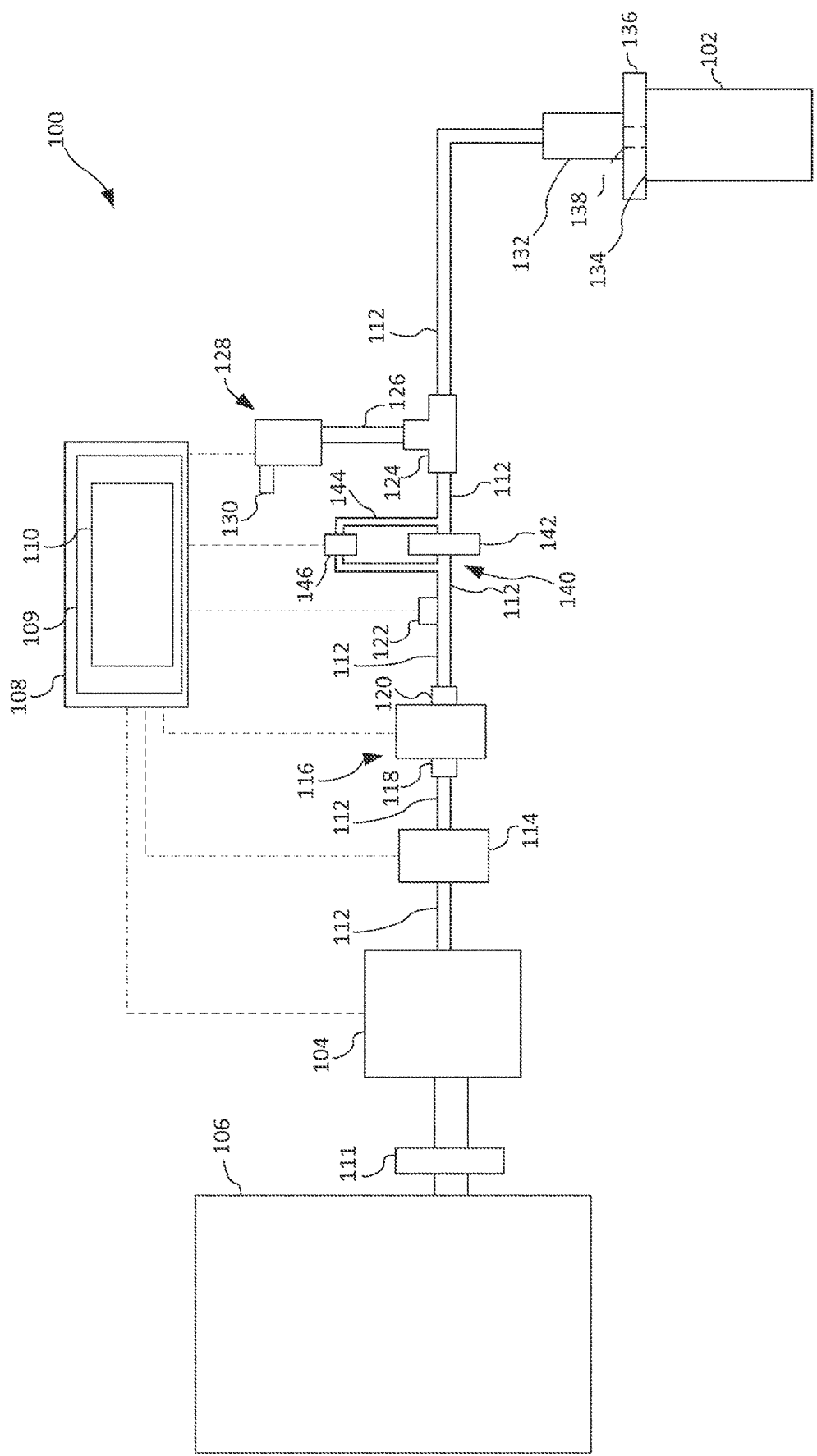
FIG. 1 is a block diagram of an example particulate filter inspection system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for inspecting particulate filters of an aftertreatment system of an internal combustion engine system. The various concepts introduced above and discussed in greater detail below may be implemented in any of numerous ways, as the described concepts are not limited to any particular manner of implementation. Examples of specific implementations and applications are provided primarily for illustrative purposes.

I. Overview

An aftertreatment system associated with an internal combustion engine system may include a particulate filter (e.g., diesel particulate filter (DPF), silicon carbide DPF, etc.). The particulate filter functions to remove particulates (e.g., diesel particulate matter, soot, etc.) from exhaust gas within the aftertreatment system. As a result, particulates build up (e.g., accumulate, accrue, collect, etc.) within the particulate filter. As particulates build up within the particulate filter, the efficiency and usability of the particulate filter may decrease. For example, the particulate filter may not be able to attain the same efficiency with respect to removing particulate when particulate has built up within the particulate filter (e.g., forming built up particulate, forming particulate deposits, etc.). Additionally, the particulate filter may create undesirable backpressure on an internal combustion engine having an aftertreatment system that includes the particulate filter when particulate has built up within the particulate filter.

In order to maintain desirable operation of the aftertreatment system, it is desirable to routinely inspect a particulate filter to determine if the particulate filter needs to be cleaned. Some systems for inspecting a particulate filter flow air through the entire particulate filter and measure a flow through the entire particulate filter. However, such systems have extremely low accuracy because flow measurements are not localized to various portions of the particulate filter. As a result of measuring flow through the entire particulate filter, fluid flows through a path of least resistance through the particulate filter, thereby masking the presence of localized regions where particulate has accumulated.

Other systems utilize various scanning technologies (e.g., x-ray, computed tomography (CT), millimeter wave, etc.) to scan a particulate filter. However, these scanning technologies cannot normally be utilized for non-cordierite particulate filters (e.g., for silicon carbide (SiC) particulate filters, etc.). Additionally, these scanning technologies cannot be easily transported for use in the field (e.g., outside of a lab setting, etc.).

Implementations herein relate to a particulate filter inspection system that includes a probe which provides air to only a sector of a particulate filter. The particulate filter inspection system then compares a pressure of the air provided to the sector with a target upper pressure to determine if the sector contains more particulate than desirable and if the sector requires cleaning and compares the pressure of the air provided to the sector with a target lower pressure to determine if the sector has a leak or has failed. By providing air to only a sector of the particulate filter, implementations herein minimize the likelihood that air will merely flow around particulate within the particulate filter and return an inaccurate measurement of the level of particulates within the particulate filter. As a result, implementations herein provide more accurate information regarding when cleaning of a particulate filter would be desirable than other systems which flow air through the entire particulate filter. As is explained in more detail herein, implementations herein enable use of an inherently variable air source, such as an air compressor, to obtain this accurate information. These air sources are typically less expensive than non-variable air sources. Therefore, implementations herein are capable of obtaining accurate information at a lower cost than other systems. Additionally, implementations herein utilize flow rate measurement systems to determine the flowrate of air from an air source to a probe. Implementations herein include a controller which utilizes this flow rate to manage a rate at which the sectors are inspected using the probe. By managing this rate, implementations herein are able to utilize a smaller air source than other systems, and therefore may be less expensive than other systems.

II. First Example Particulate Filter Inspection System

FIG. 1 depicts a particulate filter inspection system 100. The particulate filter inspection system 100 is utilized to inspect a particulate filter 102 to determine a localized pressure (e.g., flow restriction, etc.) produced by a localized level (e.g., amount, etc.) of particulates in various sectors of the particulate filter 102. In this way, the particulate filter inspection system 100 may determine locally plugged regions. The particulate filter inspection system 100 does not utilize conventional scanning technologies (e.g., scanners, readers, etc.), and is therefore capable of being produced at much lower cost than other systems which utilize such scanning technologies.

Particulates may be deposited within the particulate filter 102 during use of the particulate filter 102 in an aftertreatment system (e.g., a diesel aftertreatment system, etc.) of an internal combustion engine system (e.g., a diesel internal combustion engine system, a bi-fuel internal combustion engine system, a gasoline internal combustion engine system, a liquid nature gas internal combustion engine system, a compressed natural gas internal combustion engine system, a biofuel internal combustion engine system, an ethanol internal combustion engine system, etc.).

The particulate filter inspection system 100 includes a compressed air source 104 (e.g., air compressor, positive displacement compressor, rotatory compressor, compressor, blower, accumulator, etc.). The compressed air source 104 is configured to draw (e.g., receive, etc.) air from an air source 106 (e.g., atmosphere, etc.). The compressed air source 104 is operable between a first state (e.g., on state, engaged state, powered state, etc.) and a second state (e.g., off state, disengaged state, unpowered state, etc.). When operable, the compressed air source 104 is configured to produce air (e.g., compressed air, etc.) that is pressurized to a target compressed air source pressure (e.g., 60 pounds per square inch (psi), 70 psi, 100 psi, etc.).

The compressed air source 104 is electronically coupled to or electrically communicable with a controller 108. The controller 108 is configured to command the compressed air source 104 to be the first state or the second state (e.g., the controller 108 is configured to turn the compressed air source 104 on or off, etc.). The controller 108 may be configured to command the compressed air source 104 to be in the first state when it is desired to measure a localized pressure of flow through the particulate filter 102 and to be in the second state when it is not desired to measure a localized pressure of flow through the particulate filter 102. In this way, the controller 108 is configured to control (e.g., manipulate, etc.) the compressed air source 104. The controller 108 may also function as a power source. For example, the controller 108 may function as a 12 Volt power source (e.g., the controller 108 may be configured to provide 12 Volts to components that the controller 108 is electronically coupled to or electrically communicable with, etc.).

The controller 108 includes a processor 109. The processor 109 may include a microprocessor, an application-specific integrated circuit (ASIC), a field-programmable gate array (FPGA), etc., or combinations thereof. The processor 109 also includes a memory 110. The memory 110 may include, but is not limited to, electronic, optical, magnetic, or any other storage or transmission device capable of providing a processor, ASIC, FPGA, etc. with program instructions. The memory 110 may include a memory chip, Electrically Erasable Programmable Read-Only Memory (EEPROM), Erasable Programmable Read Only Memory (EPROM), flash memory, or any other suitable memory from which the processor 109 can read instructions. The instructions may include code from any suitable programming language.

In some embodiments, the particulate filter inspection system 100 includes an air filter 111 (e.g., air screen, paper filter, mesh screen, etc.) positioned between the air source 106 and the compressed air source 104. The air filter 111 functions to remove debris from the air received from the air source 106 prior to the air being provided to the compressed air source 104.

The particulate filter inspection system 100 also includes a primary conduit 112 (e.g., air hose, pipe, etc.) that is configured to receive (e.g., structured to receive, capable of receiving, etc.) air from the compressed air source 104. In various embodiments, the primary conduit 112 is a rubber hose. It is understood that the primary conduit 112 includes various sections (e.g., conduit sections, hose sections, etc.), each section coupled to two adjacent components of the particulate filter inspection system 100.

The particulate filter inspection system 100 also includes a de-humidifier 114. The de-humidifier 114 is configured to receive air from the compressed air source 104 via the primary conduit 112. The de-humidifier 114 is configured to remove moisture (e.g., water moisture, etc.) and/or oil (e.g., from the compressed air source 104, etc.) from the air. In some embodiments, the de-humidifier 114 is electronically coupled to or electrically communicable with the controller 108. For example, the de-humidifier 114 may, like the compressed air source 104, be operable between a first state (e.g., on state, engaged state, powered state, etc.) and a second state (e.g., off state, disengaged state, unpowered state, etc.) and the controller 108 may be configured to command the de-humidifier 114 to be the first state or the second state. For example, the controller 108 may be configured to command the de-humidifier 114 to be in the first state when the compressed air source 104 is in the first state. In another example, the particulate filter inspection system 100 may include a moisture sensor and the controller 108 may be configured to command the de-humidifier 114 to be in the first state when the moisture sensor determines that a level of moisture in the air provided by the compressed air source 104 is greater than a threshold and to be in the second state when the moisture sensor determines that the level of moisture in the air provided by the compressed air source 104 is less than the threshold. Additionally, the de-humidifier 114 may be defined by a target moisture level at which the de-humidifier 114 operates to maintain a level of moisture (e.g., as determined by a moisture sensor, etc.) in the air provided by the de-humidifier 114 at or below. The controller 108 may be configured to command the de-humidifier 114 to be in the first state or the second state based on a comparison between a moisture level of the air and the target moisture level. In this way, the controller 108 is configured to control the de-humidifier 114.

The particulate filter inspection system 100 further includes a pressure regulator 116 (e.g., control valve, etc.). The pressure regulator 116 is configured to receive air from the de-humidifier 114. The pressure regulator 116 operates to mitigate pressure spikes from the compressed air source 104 and/or the de-humidifier 114. The pressure regulator 116 is defined by a target pressure regulator pressure. In various embodiments, the pressure regulator 116 is configured to provide air to the primary conduit 112 at a pressure that is less than or equal to the target pressure regulator pressure. In other embodiments, the pressure regulator 116 is configured to provide air to the primary conduit 112 at a pressure that is greater than or equal to the target pressure regulator pressure. In some embodiments, the pressure regulator 116 is a two-stage pressure regulator. In some embodiments, the pressure regulator 116 is electronically coupled to or electrically communicable with the controller 108. The controller 108 may be configured to command the pressure regulator 116 to change the target pressure regulator pressure. In this way, the controller 108 is configured to control the pressure regulator 116.

The pressure regulator 116 includes a first fitting 118 and a second fitting 120. The first fitting 118 connects an inlet of the pressure regulator 116 to the primary conduit 112. The second fitting 120 connects an outlet of the pressure regulator 116 to the primary conduit 112. In various embodiments, the first fitting 118 and the second fitting 120 are quick-disconnect fittings. Through the use of the first fitting 118 and the second fitting 120, the pressure regulator 116 may be quickly removed (e.g., for servicing, etc.).

The particulate filter inspection system 100 also includes a mass flow meter 122 (e.g., mass flow sensor, mass air flow (MAF) sensor, MAF meter, etc.). The mass flow meter 122 is configured to determine (e.g., sense, acquire, etc.) a mass flow rate of the air passing through the mass flow meter 122. The mass flow meter 122 is electronically coupled to or electrically communicable with the controller 108. The controller 108 is configured to receive the mass flow rate from the mass flow meter 122. The mass flow rate may be provided by the controller 108 as an indication to a user testing the particulate filter 102 (e.g., for comparison against a target mass flow rate, etc.). The controller 108 may variously command the compressed air source 104, the de-humidifier 114, and/or the pressure regulator 116 based on the mass flow rate received from the mass flow meter 122. In some embodiments, the mass flow meter 122 is a 1,000 liter per minute mass flow meter (e.g., the mass flow meter 122 is capable of measure mass flow rates of up to 1,000 liters per minute, etc.).

The particulate filter inspection system 100 also includes a three-way fitting 124. The three-way fitting 124 is configured to receive air from the mass flow meter 122 via the primary conduit 112 and to provide the air to the primary conduit 112. In some embodiments, the three-way fitting 124 is a three-way national pipe thread (NPT) fitting. The three-way fitting 124 is also configured to provide the air to an first auxiliary conduit 126 (e.g., air hose, pipe, etc.). In various embodiments, the first auxiliary conduit 126 is a rubber hose.

The first auxiliary conduit 126 provides the air to a gauge 128 (e.g., a pressure gauge, etc.). The gauge 128 is configured to determine the pressure of the air in the first auxiliary conduit 126, and therefore the pressure of the air in the primary conduit 112 at a location downstream of the pressure regulator 116. In various embodiments, the gauge 128 is configured to determine gauge pressure (e.g., pressure relative to atmospheric pressure, etc.) and includes an atmospheric input 130. The gauge 128 is electronically coupled to or electrically communicable with the controller 108. The controller 108 is configured to receive the pressure of the air in the primary conduit 112 at a location downstream of the pressure regulator 116 from the gauge 128. The controller 108 may variously command the compressed air source 104, the de-humidifier 114, and/or the pressure regulator 116 based on the pressure received from the gauge 128.

The particulate filter inspection system 100 also includes a probe 132 (e.g., sensor, sensor array, measurement device, analyzer, etc.). The probe 132 is configured to receive air from the compressed air source 104 via the primary conduit 112 and to provide the air to the particulate filter 102.

The probe 132 is configured to be placed on a face 134 of the particulate filter 102 and to be selectively positioned at various discrete locations along the face 134 of the particulate filter 102. In this way, the particulate filter inspection system 100 can determine a localized pressure of flow through the particulate filter 102 at each location based on the pressure determined by the gauge 128. These localized pressures may then, for example, be utilized to determine into a level of particulates within the particulate filter 102.

The face 134 of the particulate filter 102 is sectored into a plurality (e.g., two, three, four, five, six, seven, eight, nine, ten, fifteen, twenty, twenty-five, thirty, etc.) of sectors 135, each sector having an area (e.g., surface area, etc.) that is greater than or equal to an area (e.g., surface area, etc.) of the probe 132. In this way, the probe 132 does not extend off of the face 134 or onto an adjacent sector 135 when the probe 132 is placed on a sector 135. When the probe 132 is placed on a sector 135, the probe 132 may be centered on the sector 135. In an example embodiment, the face 134 is sectored into twenty-five sectors 135. It is understood that the face 134 of the particulate filter 102 could be sectored into any number of sectors 135 such that the particulate filter inspection system 100 is tailored for a target application.

In various embodiments, the particulate filter inspection system 100 includes a volumetric flow rate measurement system 140. The volumetric flow rate measurement system 140 is configured to facilitate measurement by the controller 108 of the volumetric flow rate through the primary conduit 112. The volumetric flow rate measurement system 140 includes a venturi 142 (e.g., orifice plate, etc.), a second auxiliary conduit 144, and a differential pressure sensor 146 that is electronically coupled to or electrically communicable with the controller 108. The venturi 142 is located along the primary conduit 112, the second auxiliary conduit 144 is coupled to the primary conduit 112 on opposite sides of the venturi 142 (e.g., an upstream side of the venturi 142 and a downstream side of the venturi 142, etc.), and the differential pressure sensor 146 is disposed along the second auxiliary conduit 144. The differential pressure sensor 146 is configured to obtain a differential pressure across the venturi 142 and provide the differential pressure to the controller 108. The controller 108 utilizes characteristics (e.g., diameter, length, etc.) of the venturi 142 stored in the memory 110 to calculate the volumetric flow rate through the primary conduit 112 using the differential pressure across the venturi 142. The volumetric flow rate may be provided by the controller 108 as an indication to a user testing the particulate filter 102 (e.g., for comparison against a target volumetric flow rate, etc.). In embodiments where the particulate filter inspection system 100 includes the volumetric flow rate measurement system 140, the particulate filter inspection system 100 may, in some applications, not include the mass flow meter 122. In embodiments where the particulate filter inspection system 100 includes the mass flow meter 122, the particulate filter inspection system 100 may, in some applications, not include the volumetric flow rate measurement system 140.

Figure 2:
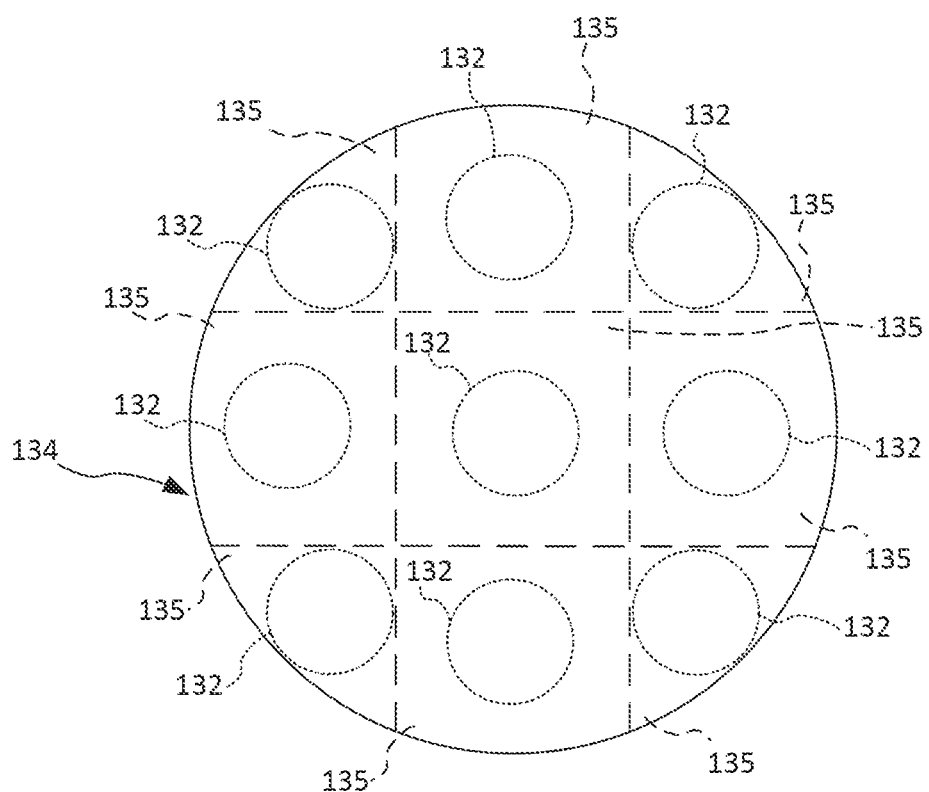
FIG. 2 is a view of a face of a particulate filter with a probe of the example particulate filter inspection system of FIG. 1 shown in various sectors of the face.

FIG. 2 illustrates the face 134 of the particulate filter 102 being divided into nine sectors 135. In operation, the particulate filter inspection system 100 may be utilized to obtain nine localized pressures, each localized pressure associated with one of the nine sectors 135. A user may, for example, turn on the particulate filter inspection system 100 (e.g., via a graphic user interface coupled to the controller 108, etc.) and subsequently locate the probe 132 on one of the sectors 135. After the probe 132 is located on one of the sectors 135, the controller 108 may notify the user (e.g., via an alert on a graphical user interface, via a sound, etc.) once a localized pressure has been determined for the sector 135 and the user may reposition the probe 132 onto another of the sectors 135 and subsequently repeat this process for all remaining sectors 135. In some applications, the user manually reads the gauge 128 to determine each localized pressure and repositions the probe 132 once a reading has been obtained.

The particulate filter inspection system 100 also includes an orifice plate 136. The orifice plate 136 is configured to be selectively coupled to the probe 132 and is configured to interface with the face 134 of the particulate filter 102 such that the orifice plate 136 is positioned between the particulate filter 102 and the probe 132. The orifice plate 136 includes at least one orifice 138. The orifice 138 facilitates flow of air from the probe 132 through the orifice plate 136 and to the face 134 of the particulate filter 102 while the remainder of the orifice plate 136 (e.g., excluding the at least one orifice 138, etc.) does not facilitate flow of air from the probe 132 through the orifice plate 136 and to the face 134 of the particulate filter 102. In some embodiments, the orifice plate 136 includes one, two three, five, ten, or other numbers of the orifices 138. The orifice 138 defines a fixed open area. This fixed open area can be used to tune the probe 132, as will be described in more detail herein.

The orifice plate 136 has an area that is equal to or greater than an area of the face 134 such that the face 134 may be covered by the orifice plate 136. In this way, air may be provided from the probe 132 to all sectors 135 simultaneously. The orifice plate 136 is utilized to calibrate the particulate filter inspection system 100 utilizing the fixed open area of the orifice 138, the pressure determined by the gauge 128, and, in some embodiments, the pressure of the air produced by the compressed air source 104 and/or the mass flow rate determined by the mass flow meter 122.

Figure 3:
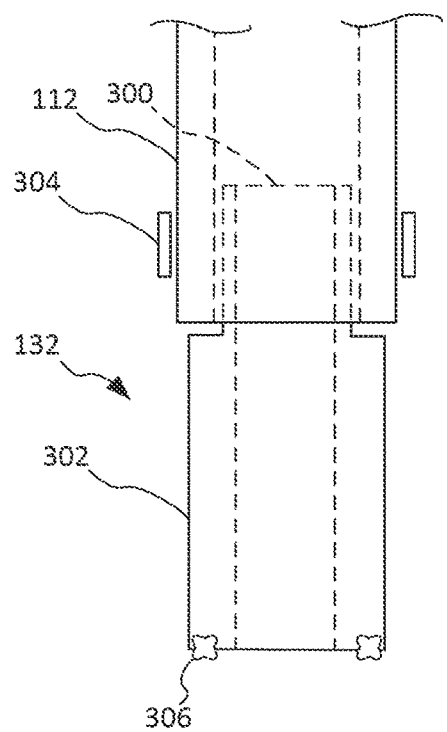
FIG. 3 is a detailed via of a portion of the example particulate filter inspection system of FIG. 1 with a probe in a first configuration.
Figure 4:
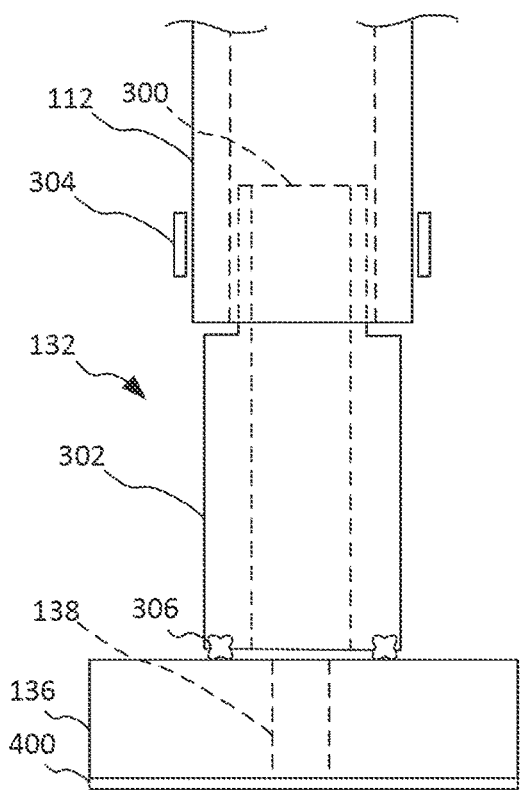
FIG. 4 is another detailed via of a portion of the example particulate filter inspection system of FIG. 1 with a probe in a second configuration.

FIGS. 3 and 4 illustrate the probe 132 in greater detail according to an example embodiment. In FIG. 3, the probe 132 is shown without the orifice plate 136 and is separate from the particulate filter 102. The probe 132 includes an insertion portion 300 and an interfacing portion 302. In various embodiments, the probe 132 has a single piece construction such that the insertion portion 300 and the interfacing portion 302 are structurally integrated. In one embodiment, the probe 132 is machined from a single piece of Nylon.

The primary conduit 112 is defined by an inner diameter dc, and the insertion portion 300 is defined by a diameter $d_P$ that is less than the inner diameter dc of the primary conduit 112 such that the insertion portion 300 may be received within the primary conduit 112. The probe 132 includes a clamp 304 (e.g., hose clamp, band clamp, etc.) that is configured to compress (e.g., squeeze, etc.) the primary conduit 112 on the insertion portion 300. In some embodiments, the inner diameter dc of the primary conduit 112 is less than the diameter $d_P$ of the insertion portion 300. In these embodiments, the probe 132 may not include a clamp 304 because constriction provided by the primary conduit 112 is sufficient to seal the primary conduit 112 on the insertion portion 300.

The probe 132 also includes a seal member 306 (e.g., gasket, bushing, etc.). The seal member 306 is coupled to the interfacing portion 302. For example, the seal member 306 may be pressed into the interfacing portion 302. The seal member 306 may additionally or alternatively be adhesively attached (e.g., affixed, coupled, etc.) to the interfacing portion 302 (e.g., using adhesive, using glue, etc.). When the orifice plate 136 is placed on the interfacing portion 302, the seal member 306 is configured to separate the interfacing portion 302 from the orifice plate 136 and to establish a seal (e.g., a substantially air tight seal, etc.) between the interfacing portion 302 and the orifice plate 136. When the orifice plate 136 is not placed on the interfacing portion 302, the seal member 306 is configured to separate the interfacing portion 302 from the face 134 of the particulate filter 102 and to establish a seal between the interfacing portion 302 and the face 134 of the particulate filter 102. In various embodiments, the seal member 306 is an x-ring (e.g., an o-ring with an "x" shaped profile, etc.). In an example embodiment, the seal member 306 has a hardness of Shore 70A.

In FIG. 4, the probe 132 is shown with the orifice plate 136 and mounted to the particulate filter 102 such that the seal member 306 separates the interfacing portion 302 from the orifice plate 136. The orifice plate 136 includes a gasket 400 (e.g., seal, etc.). The gasket 400 is coupled to the orifice plate 136. For example, the gasket 400 may be adhesively attached to the orifice plate 136 (e.g., using adhesive, using glue, etc.). Additionally, or alternatively, the gasket 400 may be pressed into the orifice plate 136. When the orifice plate 136 is placed on the particulate filter 102, the gasket 400 is configured to separate the orifice plate 136 from the face 134 of the particulate filter 102 and to establish a seal between the orifice plate 136 and the face 134 of the particulate filter 102. In various embodiments, the gasket 400 is constructed from Buna-N.

III. Example Operation of First Example Particulate Filter Inspection System

The particulate filter inspection system 100 is operable in a testing configuration and a calibration (e.g., preparation, etc.) configuration. In the testing configuration, the particulate filter inspection system 100 is utilized to inspect the particulate filter 102 to determine the localized pressures of at least one of the sector 135 of the particulate filter 102. In the testing configuration, the orifice plate 136 is not coupled to the interfacing portion 302, and the probe 132 is configured as shown in FIG. 3. Instead, the interfacing portion 302 is placed directly on the face 134 of the particulate filter 102. In the calibration configuration, the particulate filter inspection system 100 is calibrated. The orifice plate 136 is coupled to the interfacing portion 302 and the probe 132 is configured as shown in FIG. 4 when the particulate filter inspection system 100 is in the calibration configuration.

Figure 5:
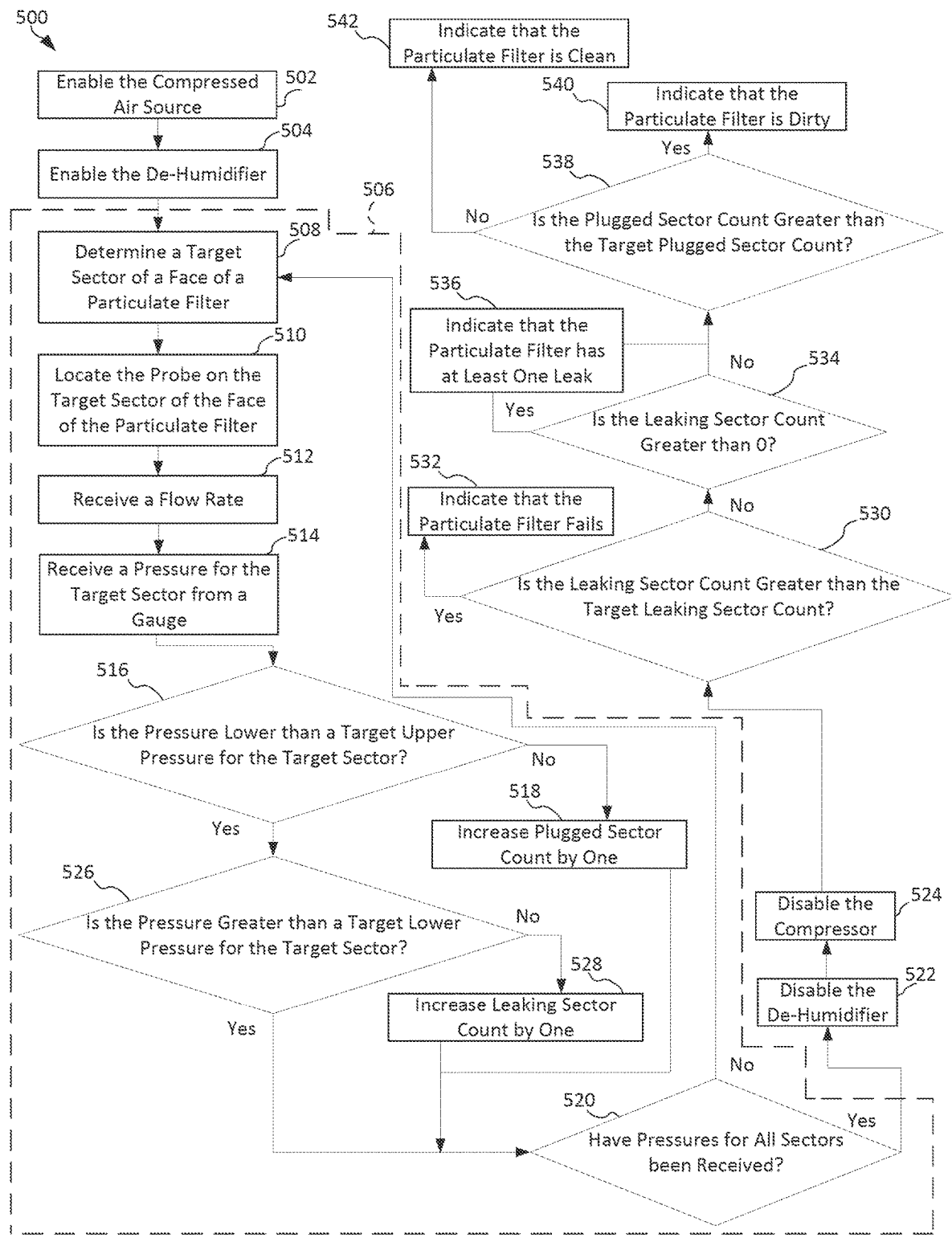
FIG. 5 is a block diagram of an example testing process implemented by the example particulate filter inspection system of FIG. 1.

FIG. 5 illustrates a testing process 500 for using the particulate filter inspection system 100. When the testing process 500 is performed, the particulate filter inspection system 100 is in the testing configuration and not in the calibration configuration. The testing process 500 begins in block 502 with commanding, by the controller 108, the compressed air source 104 to be enabled (e.g., turned on, etc.) such that the compressed air source 104 draws air from the air source 106. When the controller 108 enables the compressed air source 104, the compressed air source 104 is set to a target compressed air source pressure by the controller 108 (e.g., a pressure that the compressed air source 104 is working to compress air to, etc.). The target compressed air source pressure may be entered by a user (e.g., via a user interface electronically coupled to or electrically communicable with the controller 108, etc.) and may be a function of the particulate filter 102. For example, a user may enter a model number of the particulate filter 102 into a user interface electronically coupled to the controller 108, the controller 108 may determine a target compressed air source pressure associated with the particulate filter 102 based on the model number, and the controller 108 may command the compressed air source 104 to provide air into the primary conduit 112 at the target compressed air source pressure.

The testing process 500 continues in block 504 with commanding, by the controller 108, the de-humidifier 114 to be enabled such that the de-humidifier 114 functions to remove water and/or oil from the air received from the compressed air source 104. In some embodiments, block 504 occurs prior to block 502 such that the de-humidifier 114 can be "warmed-up" prior to the de-humidifier 114 receiving air from the compressed air source 104.

The testing process 500 includes a pressure collection process 506. The pressure collection process 506 is performed for each of the sectors 135 on a face 134 of the particulate filter 102. For example, if the face 134 of the particulate filter 102 has twenty-five sectors 135, the pressure collection process 506 is performed twenty-five times.

The pressure collection process 506 includes in block 508 determining, by the controller 108, a target sector 135 on the face 134 of the particulate filter 102. The target sector 135 may be determined based on a sector 135 for which the pressure collection process 506 was previously performed or will be subsequently performed. For example, the pressure collection process 506 may be repeated with sectors 135 selected in a patterned or organized fashion (e.g., in a clockwise direction, in a counter-clockwise direction, by snaking through a series of rows and columns of sectors 135, etc.).

The pressure collection process 506 continues in block 510 with locating, by a user, the probe 132 over the target sector 135 on the face 134 of the particulate filter 102. For example, the probe 132 may be located on a second sector 135 of the face 134 of the particulate filter 102. To locate the probe 132 over the target sector 135 on the face 134 of the particulate filter 102, the user may simply lift the probe 132 and place the probe 132 down on the face 134 over the target sector 135.

The pressure collection process 506 continues in block 512 with receiving, by the controller 108, a flow rate (e.g., a mass flow rate from the mass flow meter 122, a volumetric flow rate from the volumetric flow rate measurement system 140, etc.). The controller 108 subsequently stores the flow rate associated with the target sector 135 in the memory 110 (e.g., via indexing, etc.). The flow rate may be utilized by the processor 109 for reference purposes.

The pressure collection process 506 continues in block 514 with receiving, by the controller 108, a pressure for the target sector 135 from the gauge 128. For example, the controller 108 may receive a pressure of 5.5 psi from the gauge 128 for the target sector 135. The controller 108 subsequently stores the pressure associated with the target sector 135 in the memory 110.

The pressure collection process 506 continues in block 516 with determining, by the controller 108, if the pressure received from the gauge 128 for the target sector 135 is lower than a target upper pressure. The target upper pressure may be associated with the target sector 135 or the particulate filter 102 as a whole. For example, the target upper pressure may be 5 psi. The target upper pressure is stored in the memory 110. In some embodiments, the target upper pressure is determined by the controller 108 (e.g., based on the flow rate, based on the pressure of the air output by the compressed air source 104, via machine learning, etc.).

If in block 516, it is determined the pressure for the target sector 135 is not lower than the target upper pressure for the target sector (e.g., the pressure for the target sector 135 is greater than the target upper pressure, the pressure for the target sector 135 is equal to the target upper pressure), then the pressure collection process 506 continues in block 518 with increasing, by the controller 108, a plugged sector count stored within the memory 110. The plugged sector count indicates the raw number of sectors 135 that have pressures which are not lower than (e.g., are greater than) their associated target upper pressures. When the pressure of a sector 135 is not lower than a target upper pressure for the sector 135, the level of particulates within the sector 135 is greater than a target level of particulates for the sector 135. The pressure collection process 506 continues in block 520 with determining, by the controller 108, if pressures for all sectors 135 have been received by the controller 108. For example, the processor 109 may query the memory 110 to ensure that all of the sectors 135 are associated with a pressure. If pressures for all of the sectors 135 have been received, the pressure collection process 506 ends and the testing process 500 continues in block 522 with commanding, by the controller 108, the de-humidifier 114 to be disabled such that the de-humidifier 114 ceases to function to remove water and/or oil from the air received from the compressed air source 104. The testing process 500 then continues in block 524 with commanding, by the controller 108, the compressed air source 104 to be disabled. In some embodiments, block 524 occurs prior to block 522.

If it is determined in block 516 that the pressure received from the gauge 128 is lower than the target upper pressure, the pressure collection process 506 skips block 518 and the plugged sector count is not increased. Instead, the pressure collection process 506 continues in block 526 with determining, by the controller 108, if the pressure received from the gauge 128 for the target sector 135 is greater than a target lower pressure (e.g., is not lower than the target lower pressure, is not equal to the target lower pressure, etc.). The target lower pressure may be associated with the target sector 135 or the particulate filter 102 as a whole. For example, the target lower pressure may be 2 psi. The target lower pressure is stored in the memory 110. In some embodiments, the target lower pressure is determined by the controller 108 (e.g., based on the flow rate, based on the pressure of the air output by the compressed air source 104, via machine learning, etc.).

If in block 526, it is determined the pressure for the target sector 135 is greater than the target lower pressure for the target sector, then the pressure collection process 506 continues with block 520. However, if in block 526, it is determined the pressure for the target sector 135 is not greater than the target lower pressure for the target sector (e.g., the pressure for the target sector 135 is lower than the target lower pressure, the pressure for the target sector 135 is equal to the target lower pressure), then the pressure collection process 506 continues in block 528 with increasing, by the controller 108, a leaking sector count stored within the memory 110.

After block 524, the testing process 500 then continues in block 530 with determining, by the controller 108, if the leaking sector count is greater than a target leaking sector count. In other words, the controller 108 determines if more sectors 135 than desired have pressures that are not greater than their associated target lower pressures. If the leaking sector count is greater than the target leaking sector count, the testing process 500 continues in block 532 with indicating, by the controller 108, that the particulate filter 102 fails (e.g., does not pass, etc.) the testing process 500 and the testing process 500 subsequently ends. The controller 108 may indicate that the particulate filter 102 fails the testing process 500 by, for example, illuminating a light proximate the user, displaying text or an image on a graphical user interface, and other similar mechanisms. Additionally, the indication may convey the at least one sector 135 that had a pressure that was not greater than its associated target lower pressure, so as to facilitate inspection of the at least one sector 135, specifically.

If the leaking sector count is not greater than the target leaking sector count, the testing process 500 continues in block 534 with determining, by the controller 108, if the leaking sector count is greater than 0. In other words, the controller 108 determines any sectors 135 have pressures that are not greater than their associated target lower pressures. If the leaking sector count is greater than 0, the testing process 500 continues in block 536 with indicating, by the controller 108, that the particulate filter 102 has at least one leak. The controller 108 may indicate that the particulate filter 102 has at least one leak by, for example, illuminating a light proximate the user, displaying text or an image on a graphical user interface, and other similar mechanisms. Additionally, the indication may convey the at least one sector 135 that had a pressure that was not greater than its associated target lower pressure, so as to facilitate inspection of the at least one sector 135, specifically.

Regardless of whether the particulate filter 102 has any leaks, the testing process 500 continues in block 538 with determining, by the controller 108, if the plugged sector count is greater than a target plugged sector count. In other words, the controller 108 determines if more sectors 135 than desired have pressures that are greater than their associated target upper pressures. If the plugged sector count is greater than the target plugged sector count, the testing process 500 continues in block 540 with indicating, by the controller 108, that the particulate filter 102 is dirty (e.g., did not pass the testing process 500, etc.) and the testing process 500 subsequently ends. The controller 108 may indicate that the particulate filter 102 is dirty by, for example, illuminating a light proximate the user, displaying text or an image on a graphical user interface, and other similar mechanisms. Additionally, the indication may convey the at least one sector 135 that had a pressure greater than its associated target upper pressure, so as to facilitate cleaning of the at least one sector 135, specifically.

If the plugged sector count is not greater than the target plugged sector count, the testing process 500 continues in block 542 with indicating, by the controller 108, that the particulate filter 102 is clean (e.g., passed the testing process 500, etc.) and the testing process 500 subsequently ends. The controller 108 may indicate that the particulate filter 102 is clean by, for example, illuminating a light proximate the user, displaying text or an image on a graphical user interface, and other similar mechanisms. Even if the controller 108 indicates that the particulate filter 102 is clean, the indication may still convey any sectors 135 that had a pressure greater than its associated target upper pressure, so as to facilitate cleaning of those sectors 135, specifically, or to facilitate estimation of a remaining service life of the particulate filter 102 (e.g., an amount of time left before the particulate filter 102 will require cleaning, etc.).

If it is determined in block 520 that pressures from all sectors 135 have not been received, the pressure collection process 506 continues with block 508 (i.e., skipping blocks 522, 524, 530, 532, 534, 536, 538, 540, and 542).

It is understood that in some embodiments, the testing process 500 does not include blocks 534 or 536. In these embodiments, the testing process 500 is capable of indicating that the particulate filter 102 has failed but is not capable of indicating that the particulate filter 102 has at least one leak. In these embodiments, the testing process 500 may, or may not, indicate that the particulate filter 102 is clean or dirty (e.g., the testing process 500 may or may not include blocks 538, 540, and 542, etc.). Such embodiments may be advantageous where the number of sectors 135 is large and/or when some leaking of the particulate filter 102 is permissible (e.g., is within specification, etc.).

Similarly, it is also understood that in some embodiments, the testing process 500 does not include blocks 530 or 532. In these embodiments, the testing process 500 is capable of indicating that the particulate filter 102 has at least one leak but is not capable of indicating that the particulate filter 102 has failed. In these embodiments, the testing process 500 may, or may not, indicate that the particulate filter 102 is clean or dirty (e.g., the testing process 500 may or may not include blocks 538, 540, and 542, etc.). Such embodiments may be advantageous where the any leak in the particulate filter 102 is considered a failure of the particulate filter 102 (e.g., critical applications, military applications, etc.).

Figure 6:
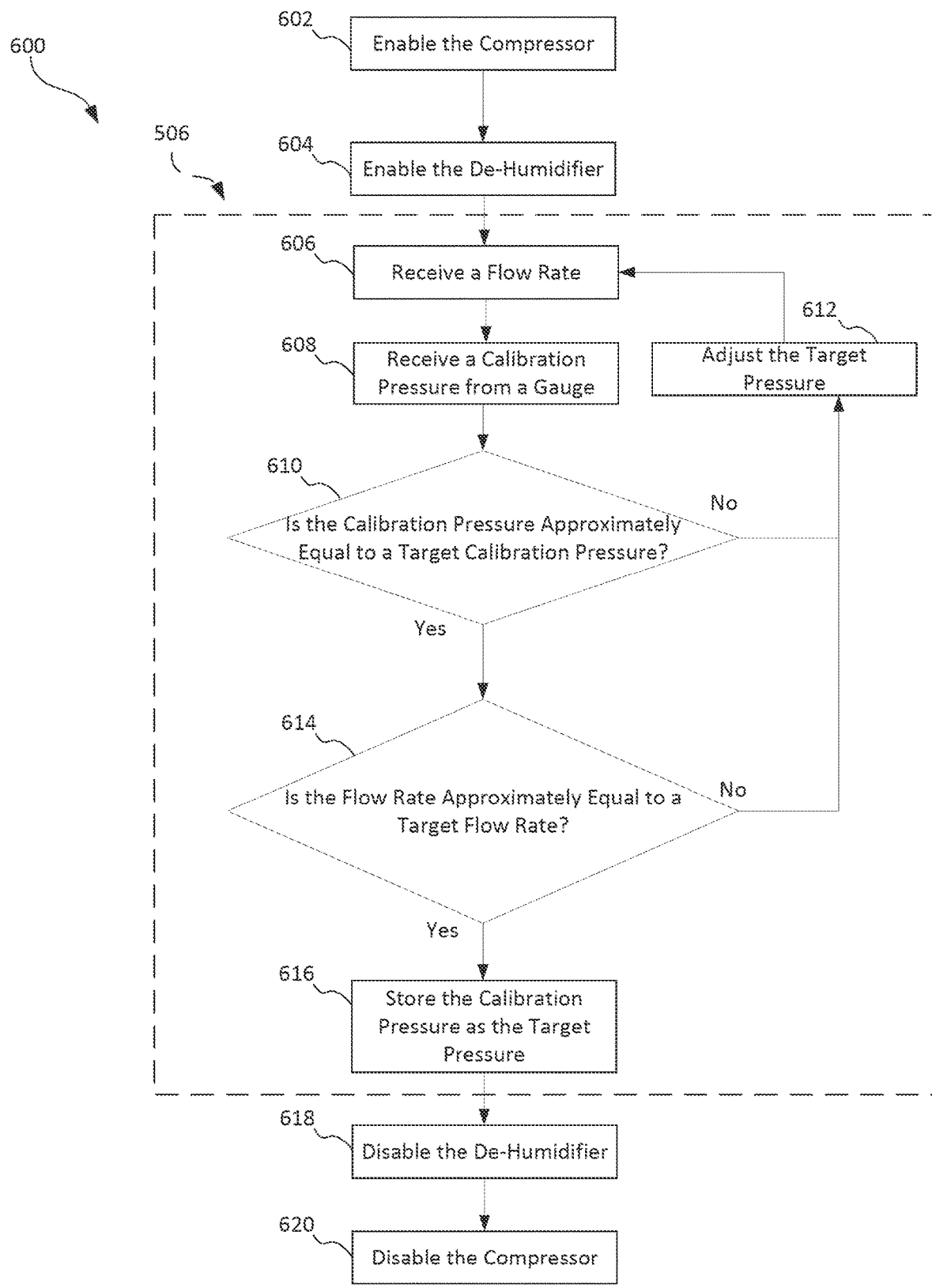
FIG. 6 is a block diagram of an example calibration process implemented by the example particulate filter inspection system of FIG. 1.

FIG. 6 illustrates a calibration process 600 for using the particulate filter inspection system 100. When the calibration process 600 is performed, the particulate filter inspection system 100 is in the calibration configuration and not in the testing configuration. The calibration process 600 begins in block 602 with commanding, by the controller 108, the compressed air source 104 to be enabled (e.g., turned on, etc.) such that the compressed air source 104 draws air from the air source 106. When the controller 108 enables the compressed air source 104, the compressed air source 104 is set to a target compressed air source pressure by the controller 108 (e.g., a pressure that the compressed air source 104 is working to compress air to, etc.). The target compressed air source pressure may be entered by a user (e.g., via a user interface electronically coupled to or electrically communicable with the controller 108, etc.) and may be a function of the particulate filter 102. For example, a user may enter a model number of the particulate filter 102 into a user interface electronically coupled to the controller 108, the controller 108 may determine a target compressed air source pressure associated with the particulate filter 102 based on the model number, and the controller 108 may command the compressed air source 104 to provide air into the primary conduit 112 at the target compressed air source pressure.

The calibration process 600 continues in block 604 with commanding, by the controller 108, the de-humidifier 114 to be enabled such that the de-humidifier 114 functions to remove water and/or oil from the air received from the compressed air source 104. In some embodiments, block 604 occurs prior to block 602 such that the de-humidifier 114 can be "warmed-up" prior to the de-humidifier 114 receiving air from the compressed air source 104.

The calibration process 600 continues in block 606 with receiving, by the controller 108, a flow rate (e.g., a mass flow rate from the mass flow meter 122, a volumetric flow rate from the volumetric flow rate measurement system 140, etc.). The controller 108 subsequently stores the flow rate in the memory 110. The flow rate may be utilized by the processor 109 for reference purposes.

The calibration process 600 continues in block 608 with receiving, by the controller 108, a calibration pressure from the gauge 128. Unlike the testing process 500, the calibration pressure received in the calibration process 600 may be for more than one sector 135 due to the orifice plate 136. For example, the controller 108 may receive a calibration pressure of 4.5 psi from the gauge 128. The controller 108 subsequently stores the calibration pressure in the memory 110.

The calibration process 600 continues in block 610 with determining, by the controller 108, if the calibration pressure received from the gauge 128 is approximately equal to (e.g., within 5% of, etc.) a target calibration pressure. The target calibration pressure may be associated with the particulate filter 102.

If the calibration pressure is not approximately equal to the target calibration pressure, then the calibration process 600 continues in block 612 with adjusting (e.g., increasing, decreasing, etc.), by the controller 108, the target compressed air source pressure of the compressed air source 104. The calibration process 600 then continues with block 606.

If it is determined in block 610 that the calibration pressure is approximately equal to the target calibration pressure, then the calibration process 600 continues in block 614 with determining, by the controller 108, if the flow rate is approximately equal to (e.g., within 5% of, etc.) a target flow rate. The target flow rate may be associated with the particulate filter 102. If it is determined in block 614 that the flow rate is not approximately equal to the target flow rate, then the calibration process 600 continues with block 612.

If it is determined in block 614 that the flow rate is approximately equal to the target flow rate, then the calibration process continues with in block 616 storing, by the controller 108, the calibration pressure as the target upper pressure in the memory 110. The target upper pressure may be utilized when the testing process 500 is implemented. The calibration process 600 continues in block 618 with commanding, by the controller 108, the de-humidifier 114 to be disabled such that the de-humidifier 114 ceases to function to remove water and/or oil from the air received from the compressed air source 104. The calibration process 600 then continues in block 620 with commanding, by the controller 108, the compressed air source 104 to be disabled. In some embodiments, block 620 occurs prior to block 618.

IV. Second Example Particulate Filter Inspection System

Figure 7:
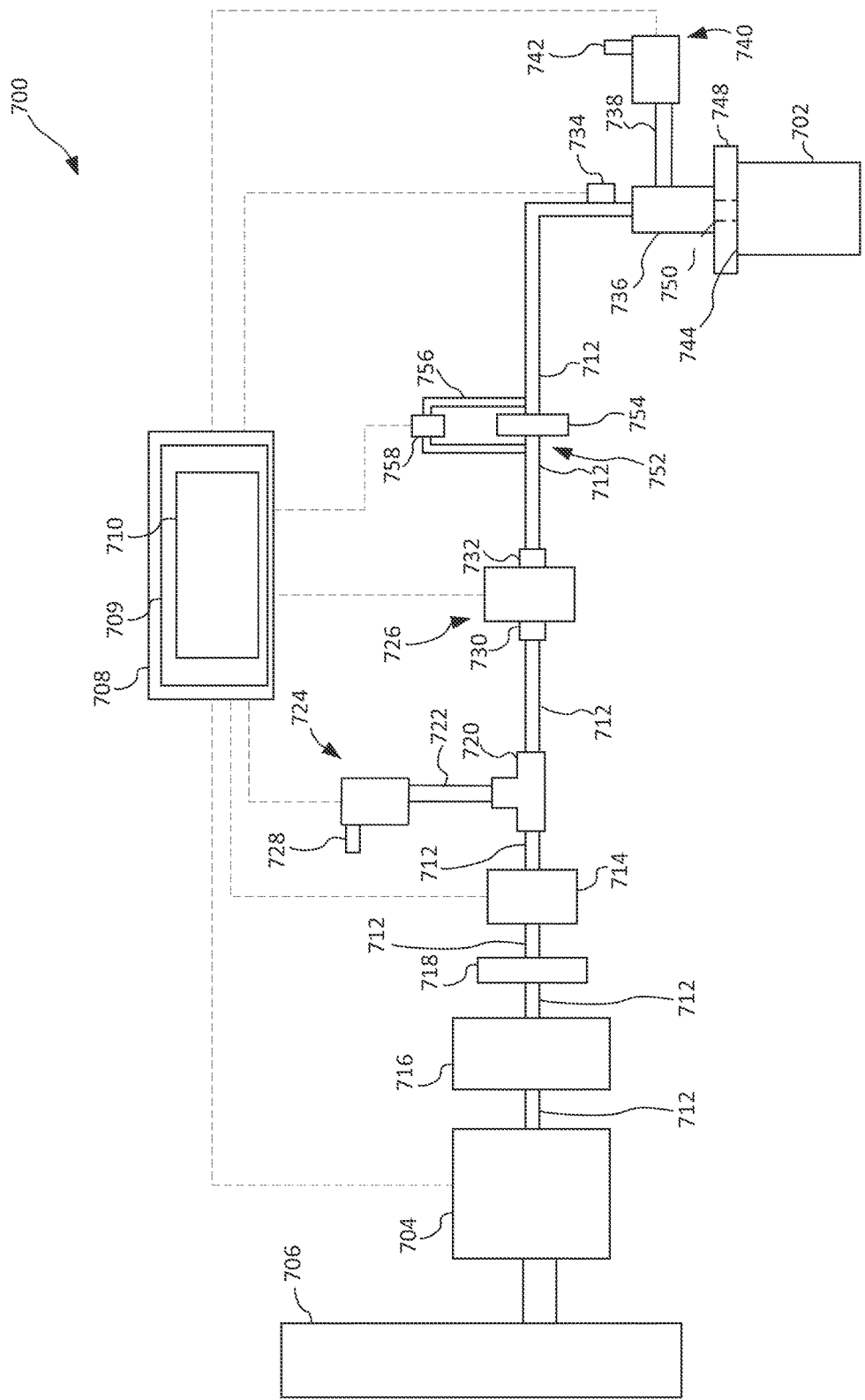
FIG. 7 is a block diagram of another example particulate filter inspection system.

FIG. 7 depicts a particulate filter inspection system 700. The particulate filter inspection system 700 is utilized to inspect a particulate filter 702 to determine a localized pressure (e.g., flow restriction, etc.) produced by a localized level (e.g., amount, etc.) of particulates in various sectors of the particulate filter 702. In this way, the particulate filter inspection system 700 may determine locally plugged regions. The particulate filter inspection system 700 does not utilize conventional scanning technologies (e.g., scanners, readers, etc.), and is therefore capable of being produced at much lower cost than other systems which utilize such scanning technologies.

Particulates may be deposited within the particulate filter 702 during use of the particulate filter 702 in an aftertreatment system (e.g., a diesel aftertreatment system, etc.) of an internal combustion engine system (e.g., a diesel internal combustion engine system, a bi-fuel internal combustion engine system, a gasoline internal combustion engine system, a liquid nature gas internal combustion engine system, a compressed natural gas internal combustion engine system, a biofuel internal combustion engine system, an ethanol internal combustion engine system, etc.).

The particulate filter inspection system 700 includes a compressed air source 704 (e.g., air compressor, positive displacement compressor, rotatory compressor, compressor, blower, accumulator, etc.). The compressed air source 704 is configured to draw (e.g., receive, etc.) air from an air source 706 (e.g., atmosphere, etc.). The compressed air source 704 is operable between a first state (e.g., on state, engaged state, powered state, etc.) and a second state (e.g., off state, disengaged state, unpowered state, etc.). When operable, the compressed air source 704 is configured to produce air (e.g., compressed air, etc.) that is pressurized to a target compressed air source pressure (e.g., 60 pounds per square inch (psi), 70 psi, 100 psi, etc.).

The compressed air source 704 is electronically coupled to or electrically communicable with a controller 708. The controller 708 is configured to command the compressed air source 704 to be the first state or the second state (e.g., the controller 708 is configured to turn the compressed air source 704 on or off, etc.). The controller 708 may be configured to command the compressed air source 704 to be in the first state when it is desired to measure a localized pressure of flow through the particulate filter 702 and to be in the second state when it is not desired to measure a localized pressure of flow through the particulate filter 702. In this way, the controller 708 is configured to control (e.g., manipulate, etc.) the compressed air source 704. The controller 708 may also function as a power source. For example, the controller 708 may function as a 12 Volt power source (e.g., the controller 708 may be configured to provide 12 Volts to components that the controller 708 is electronically coupled to or electrically communicable with, etc.).

The controller 708 includes a processor 709. The processor 709 may include a microprocessor, an application-specific integrated circuit (ASIC), a field-programmable gate array (FPGA), etc., or combinations thereof. The processor 709 also includes a memory 710. The memory 710 may include, but is not limited to, electronic, optical, magnetic, or any other storage or transmission device capable of providing a processor, ASIC, FPGA, etc. with program instructions. The memory 710 may include a memory chip, Electrically Erasable Programmable Read-Only Memory (EEPROM), Erasable Programmable Read Only Memory (EPROM), flash memory, or any other suitable memory from which the processor 709 can read instructions. The instructions may include code from any suitable programming language.

The particulate filter inspection system 700 also includes a primary conduit 712 (e.g., air hose, pipe, etc.) that is configured to receive (e.g., structured to receive, capable of receiving, etc.) air from the compressed air source 704. In various embodiments, the primary conduit 712 is a rubber hose. It is understood that the primary conduit 712 includes various sections (e.g., conduit sections, hose sections, etc.), each section coupled to two adjacent components of the particulate filter inspection system 700.

The particulate filter inspection system 700 also includes a de-humidifier 714. The de-humidifier 714 is configured to receive air from the compressed air source 704 via the primary conduit 712. The de-humidifier 714 is configured to remove moisture (e.g., water moisture, etc.) and/or oil (e.g., from the compressed air source 704, etc.) from the air. In some embodiments, the de-humidifier 714 is electronically coupled to or electrically communicable with the controller 708. For example, the de-humidifier 714 may, like the compressed air source 704, be operable between a first state (e.g., on state, engaged state, powered state, etc.) and a second state (e.g., off state, disengaged state, unpowered state, etc.) and the controller 708 may be configured to command the de-humidifier 714 to be the first state or the second state. For example, the controller 708 may be configured to command the de-humidifier 714 to be in the first state when the compressed air source 704 is in the first state. In another example, the particulate filter inspection system 700 may include a moisture sensor and the controller 708 may be configured to command the de-humidifier 714 to be in the first state when the moisture sensor determines that a level of moisture in the air provided by the compressed air source 704 is greater than a threshold and to be in the second state when the moisture sensor determines that the level of moisture in the air provided by the compressed air source 704 is less than the threshold. Additionally, the de-humidifier 714 may be defined by a target moisture level at which the de-humidifier 714 operates to maintain a level of moisture (e.g., as determined by a moisture sensor, etc.) in the air provided by the de-humidifier 714 at or below. The controller 708 may be configured to command the de-humidifier 714 to be in the first state or the second state based on a comparison between a moisture level of the air and the target moisture level. In this way, the controller 708 is configured to control the de-humidifier 714.

In some embodiments, the particulate filter inspection system 700 includes a compressed air tank 716. The compressed air tank 716 receives compressed air from the compressed air source 704 via the primary conduit 712 and stores the compressed air for use by the particulate filter inspection system 700. The compressed air tank 716 may include a purge valve. The compressed air tank 716 is positioned between the compressed air source 704 and the de-humidifier 714.

In some embodiments, the particulate filter inspection system 700 includes an air filter 718 (e.g., air screen, paper filter, mesh screen, etc.) positioned between the compressed air tank 716 and the de-humidifier 714. The air filter 718 functions to remove debris from the air received from the compressed air tank 716 via the primary conduit 712 prior to the air being provided to the de-humidifier 714. In some embodiments where the particulate filter inspection system 700 does not include the compressed air tank 716, the air filter 718 is positioned between the compressed air source 704 and the de-humidifier 714.

The particulate filter inspection system 700 also includes a three-way fitting 720. The three-way fitting 720 is configured to receive air from the de-humidifier 714 via the primary conduit 712 and to provide the air to the primary conduit 712. In some embodiments, the three-way fitting 720 is a three-way national pipe thread (NPT) fitting. The three-way fitting 720 is also configured to provide the air to a first auxiliary conduit 722 (e.g., air hose, pipe, etc.). In various embodiments, the first auxiliary conduit 722 is a rubber hose.

The first auxiliary conduit 722 provides the air to a upstream gauge 724 (e.g., a pressure gauge, etc.) positioned upstream of the pressure regulator 726. The upstream gauge 724 is configured to determine the pressure of the air in the first auxiliary conduit 722, and therefore the pressure of the air in the primary conduit 712 at a location upstream of a pressure regulator 726, as described below. In various embodiments, the upstream gauge 724 is configured to determine gauge pressure (e.g., pressure relative to atmospheric pressure, etc.) and includes a first atmospheric input 728. The upstream gauge 724 is electronically coupled to or electrically communicable with the controller 708. The controller 708 is configured to receive the pressure of the air in the primary conduit 712 at a location upstream of the pressure regulator 726 from the upstream gauge 724. The controller 708 may variously command the compressed air source 704, the de-humidifier 714, and/or the pressure regulator 726 based on the pressure received from the upstream gauge 724.

As mentioned above, the particulate filter inspection system 700 further includes the pressure regulator 726 (e.g., control valve, etc.). The pressure regulator 726 is configured to receive air from the three-way fitting 720. The pressure regulator 726 operates to mitigate pressure spikes from the compressed air source 704 and/or the de-humidifier 714. The pressure regulator 726 is defined by a target pressure regulator pressure. In various embodiments, the pressure regulator 726 is configured to provide air to the primary conduit 712 at a pressure that is less than or equal to the target pressure regulator pressure. In other embodiments, the pressure regulator 726 is configured to provide air to the primary conduit 712 at a pressure that is greater than or equal to the target pressure regulator pressure. In some embodiments, the pressure regulator 726 is a two-stage pressure regulator. In some embodiments, the pressure regulator 726 is electronically coupled to or electrically communicable with the controller 708. The controller 708 may be configured to command the pressure regulator 726 to change the target pressure regulator pressure. In this way, the controller 708 is configured to control the pressure regulator 726.

The pressure regulator 726 includes a first fitting 730 and a second fitting 732. The first fitting 730 connects an inlet of the pressure regulator 726 to the primary conduit 712. The second fitting 732 connects an outlet of the pressure regulator 726 to the primary conduit 712. In various embodiments, the first fitting 730 and the second fitting 732 are quick-disconnect fittings. Through the use of the first fitting 730 and the second fitting 732, the pressure regulator 726 may be quickly removed (e.g., for servicing, etc.).

The particulate filter inspection system 700 also includes a mass flow meter 734 (e.g., mass flow sensor, mass air flow (MAF) sensor, MAF meter, etc.). The mass flow meter 734 is configured to determine (e.g., sense, acquire, etc.) a mass flow rate of the air passing through the mass flow meter 734. The mass flow meter 734 is electronically coupled to or electrically communicable with the controller 708. The controller 708 is configured to receive the mass flow rate from the mass flow meter 734. The mass flow rate may be provided by the controller 708 as an indication to a user testing the particulate filter 702 (e.g., for comparison against a target mass flow rate, etc.). The controller 708 may variously command the compressed air source 704, the de-humidifier 714, and/or the pressure regulator 726 based on the mass flow rate received from the mass flow meter 734. In some embodiments, the mass flow meter 734 is a 1,000 liter per minute mass flow meter (e.g., the mass flow meter 734 is capable of measure mass flow rates of up to 1,000 liters per minute, etc.).

The particulate filter inspection system 700 also includes a probe 736 (e.g., sensor, sensor array, measurement device, analyzer, etc.). The probe 736 is configured to receive air from the compressed air source 704 via the primary conduit 712 and to provide the air to the particulate filter 702.

The particulate filter inspection system 700 also includes a second auxiliary conduit 738 (e.g., air hose, pipe, etc.) coupled to the probe 736. In various embodiments, the second auxiliary conduit 738 is a rubber hose. The second auxiliary conduit 738 provides the air from the probe 736 to a gauge 740 (e.g., a pressure gauge, etc.) attached to the probe 736. The gauge 740 is configured to determine the pressure of the air in the second auxiliary conduit 738, and therefore the pressure of the air in the probe 736 (e.g., the pressure of the air at a location downstream of the pressure regulator 726, etc.). In various embodiments, the gauge 740 is configured to determine gauge pressure (e.g., pressure relative to atmospheric pressure, etc.) and includes a second atmospheric input 742. The gauge 740 is electronically coupled to or electrically communicable with the controller 708. The controller 708 is configured to receive the pressure of the air in the probe 736 from the gauge 740. The controller 708 may variously command the compressed air source 704, the de-humidifier 714, and/or the pressure regulator 726 based on the pressure received from the gauge 740.

The probe 736 is configured to be placed on a face 744 of the particulate filter 702 and to be selectively positioned at various discrete locations along the face 744 of the particulate filter 702. In this way, the particulate filter inspection system 700 can determine a localized pressure of flow through the particulate filter 702 at each location based on the pressure determined by the gauge 740. These localized pressures may then, for example, be utilized to determine into a level of particulates within the particulate filter 702.

The face 744 of the particulate filter 702 is sectored into a plurality (e.g., two, three, four, five, six, seven, eight, nine, ten, fifteen, twenty, twenty-five, thirty, etc.) of sectors 746, each sector having an area (e.g., surface area, etc.) that is greater than or equal to an area (e.g., surface area, etc.) of the probe 736. In this way, the probe 736 does not extend off of the face 744 or onto an adjacent sector 746 when the probe 736 is placed on a sector 746. When the probe 736 is placed on a sector 746, the probe 736 may be centered on the sector 746. In an example embodiment, the face 744 is sectored into twenty-five sectors 746. It is understood that the face 744 of the particulate filter 702 could be sectored into any number of sectors 746 such that the particulate filter inspection system 700 is tailored for a target application.

In various embodiments, the particulate filter inspection system 700 also includes an orifice plate 748. The orifice plate 748 is configured to be selectively coupled to the probe 736 and is configured to interface with the face 744 of the particulate filter 702 such that the orifice plate 748 is positioned between the particulate filter 702 and the probe 736. The orifice plate 748 includes at least one orifice 750. The orifice 750 facilitates flow of air from the probe 736 through the orifice plate 748 and to the face 744 of the particulate filter 702 while the remainder of the orifice plate 748 (e.g., excluding the at least one orifice 750, etc.) does not facilitate flow of air from the probe 736 through the orifice plate 748 and to the face 744 of the particulate filter 702. In some embodiments, the orifice plate 748 includes one, two three, five, ten, or other numbers of the orifices 750. The orifice 750 defines a fixed open area. This fixed open area can be used to tune the probe 736, as will be described in more detail herein.

The orifice plate 748 has an area that is equal to or greater than an area of the face 744 such that the face 744 may be covered by the orifice plate 748. In this way, air may be provided from the probe 736 to all sectors 746 simultaneously. The orifice plate 748 is utilized to calibrate the particulate filter inspection system 700 utilizing the fixed open area of the orifice 750, the pressure determined by the gauge 740, and, in some embodiments, the pressure of the air produced by the compressed air source 704 and/or the mass flow rate determined by the mass flow meter 734.

In various embodiments, the particulate filter inspection system 700 includes a volumetric flow rate measurement system 752. The volumetric flow rate measurement system 752 is configured to facilitate measurement by the controller 708 of the volumetric flow rate through the primary conduit 712. The volumetric flow rate measurement system 752 includes a venturi 754 (e.g., orifice plate, etc.), a third auxiliary conduit 756, and a differential pressure sensor 758 that is electronically coupled to or electrically communicable with the controller 708. The venturi 754 is located along the primary conduit 712, the third auxiliary conduit 756 is coupled to the primary conduit 712 on opposite sides of the venturi 754 (e.g., an upstream side of the venturi 754 and a downstream side of the venturi 754, etc.), and the differential pressure sensor 758 is disposed along the third auxiliary conduit 756. The differential pressure sensor 758 is configured to obtain a differential pressure across the venturi 754 and provide the differential pressure to the controller 708. The controller 708 utilizes characteristics (e.g., diameter, length, etc.) of the venturi 754 stored in the memory 710 to calculate the volumetric flow rate through the primary conduit 712 using the differential pressure across the venturi 754. The volumetric flow rate may be provided by the controller 708 as an indication to a user testing the particulate filter 702 (e.g., for comparison against a target volumetric flow rate, etc.). In embodiments where the particulate filter inspection system 700 includes the volumetric flow rate measurement system 752, the particulate filter inspection system 700 may, in some applications, not include the mass flow meter 734. In embodiments where the particulate filter inspection system 700 includes the mass flow meter 734, the particulate filter inspection system 700 may, in some applications, not include the volumetric flow rate measurement system 752.

Figure 8:
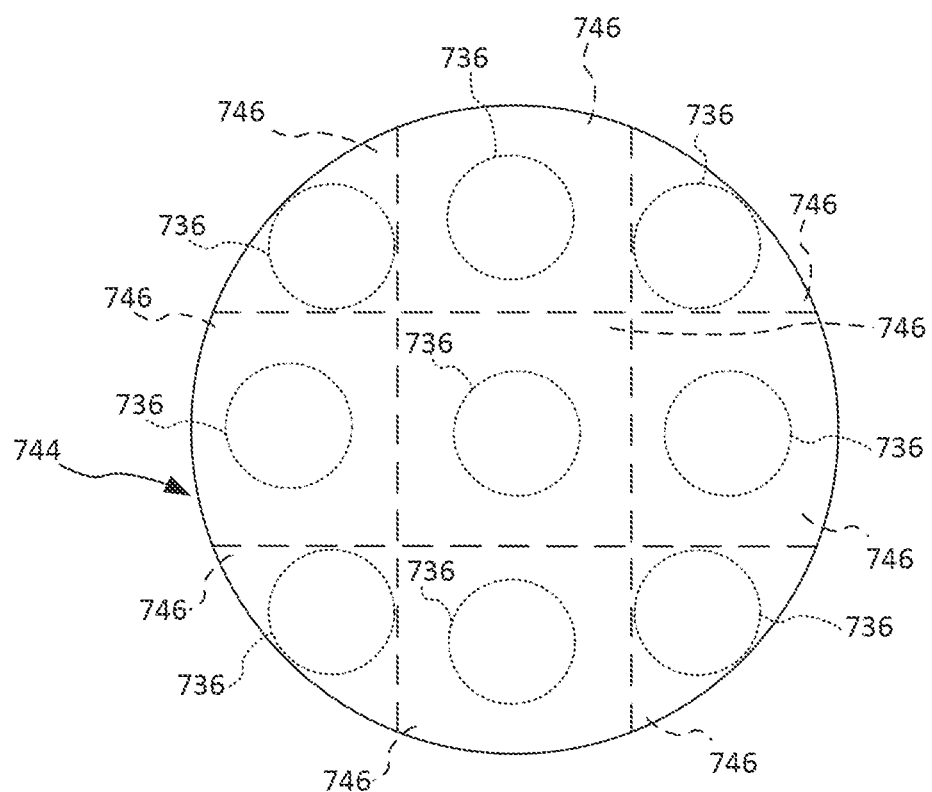
FIG. 8 is a view of a face of a particulate filter with a probe of the example particulate filter inspection system of FIG. 7 shown in various sectors of the face.

FIG. 8 illustrates the face 744 of the particulate filter 702 being divided into nine sectors 746. In operation, the particulate filter inspection system 700 may be utilized to obtain nine localized pressures, each localized pressure associated with one of the nine sectors 746. A user may, for example, turn on the particulate filter inspection system 700 (e.g., via a graphic user interface coupled to the controller 708, etc.) and subsequently locate the probe 736 on one of the sectors 746. After the probe 736 is located on one of the sectors 746, the controller 708 may notify the user (e.g., via an alert on a graphical user interface, via a sound, etc.) once a localized pressure has been determined for the sector 746 and the user may reposition the probe 736 onto another of the sectors 746 and subsequently repeat this process for all remaining sectors 746. In some applications, the user manually reads the gauge 740 to determine each localized pressure and repositions the probe 736 once a reading has been obtained.

Figure 9:
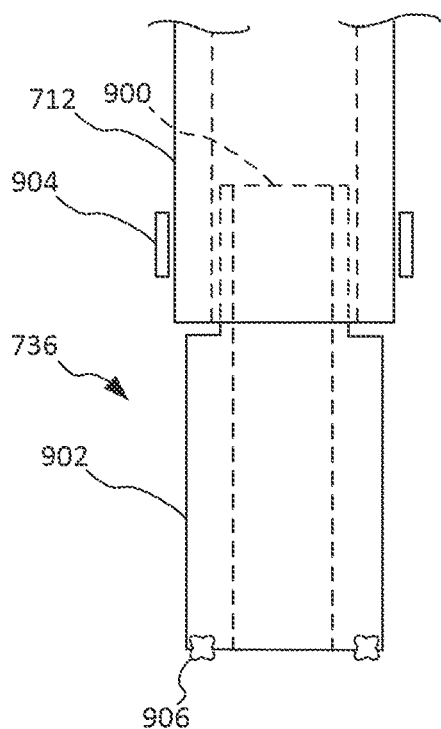
FIG. 9 is a detailed via of a portion of the example particulate filter inspection system of FIG. 7 with a probe in a first configuration.
Figure 10:
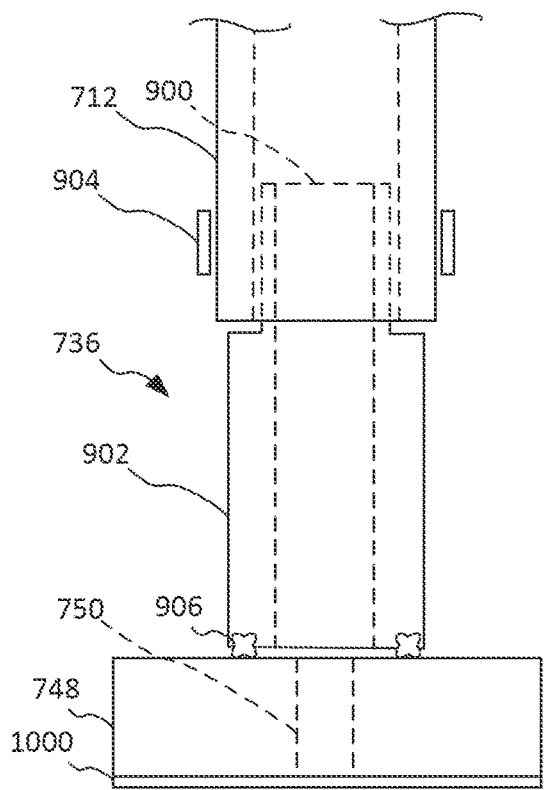
FIG. 10 is another detailed via of a portion of the example particulate filter inspection system of FIG. 7 with a probe in a second configuration.

FIGS. 9 and 10 illustrate the probe 736 in greater detail according to an example embodiment. In FIG. 9, the probe 736 is shown without the orifice plate 748 and is separate from the particulate filter 702. The probe 736 includes an insertion portion 900 and an interfacing portion 902. In various embodiments, the probe 736 has a single piece construction such that the insertion portion 900 and the interfacing portion 902 are structurally integrated. In one embodiment, the probe 736 is machined from a single piece of Nylon.

The primary conduit 712 is defined by an inner diameter dc, and the insertion portion 900 is defined by a diameter $d_P$ that is less than the inner diameter dc of the primary conduit 712 such that the insertion portion 900 may be received within the primary conduit 712. The probe 736 includes a clamp 904 (e.g., hose clamp, band clamp, etc.) that is configured to compress (e.g., squeeze, etc.) the primary conduit 712 on the insertion portion 900. In some embodiments, the inner diameter dc of the primary conduit 712 is less than the diameter $d_P$ of the insertion portion 900. In these embodiments, the probe 736 may not include a clamp 904 because constriction provided by the primary conduit 712 is sufficient to seal the primary conduit 712 on the insertion portion 900.

The probe 736 also includes a seal member 906 (e.g., gasket, bushing, etc.). The seal member 906 is coupled to the interfacing portion 902. For example, the seal member 906 may be pressed into the interfacing portion 902. The seal member 906 may additionally or alternatively be adhesively attached (e.g., affixed, coupled, etc.) to the interfacing portion 902 (e.g., using adhesive, using glue, etc.). When the orifice plate 748 is placed on the interfacing portion 902, the seal member 906 is configured to separate the interfacing portion 902 from the orifice plate 748 and to establish a seal (e.g., a substantially air tight seal, etc.) between the interfacing portion 902 and the orifice plate 748. When the orifice plate 748 is not placed on the interfacing portion 902, the seal member 906 is configured to separate the interfacing portion 902 from the face 744 of the particulate filter 702 and to establish a seal between the interfacing portion 902 and the face 744 of the particulate filter 702. In various embodiments, the seal member 906 is an x-ring (e.g., an o-ring with an "x" shaped profile, etc.). In an example embodiment, the seal member 906 has a hardness of Shore 70A.

In FIG. 10, the probe 736 is shown with the orifice plate 748 and mounted to the particulate filter 702 such that the seal member 906 separates the interfacing portion 902 from the orifice plate 748. The orifice plate 748 includes a gasket 1000 (e.g., seal, etc.). The gasket 1000 is coupled to the orifice plate 748. For example, the gasket 1000 may be adhesively attached to the orifice plate 748 (e.g., using adhesive, using glue, etc.). Additionally, or alternatively, the gasket 1000 may be pressed into the orifice plate 748. When the orifice plate 748 is placed on the particulate filter 702, the gasket 1000 is configured to separate the orifice plate 748 from the face 744 of the particulate filter 702 and to establish a seal between the orifice plate 748 and the face 744 of the particulate filter 702. In various embodiments, the gasket 1000 is constructed from Buna-N.

V. Example Operation of Second Example Particulate Filter Inspection System

The particulate filter inspection system 700 is operable in a testing configuration and a calibration (e.g., preparation, etc.) configuration. In the testing configuration, the particulate filter inspection system 700 is utilized to inspect the particulate filter 702 to determine the localized pressures of at least one of the sector 746 of the particulate filter 702. In the testing configuration, the orifice plate 748 is not coupled to the interfacing portion 902, and the probe 736 is configured as shown in FIG. 9. Instead, the interfacing portion 902 is placed directly on the face 744 of the particulate filter 702. In the calibration configuration, the particulate filter inspection system 700 is calibrated. The orifice plate 748 is coupled to the interfacing portion 902 and the probe 736 is configured as shown in FIG. 10 when the particulate filter inspection system 700 is in the calibration configuration.

Figure 11:
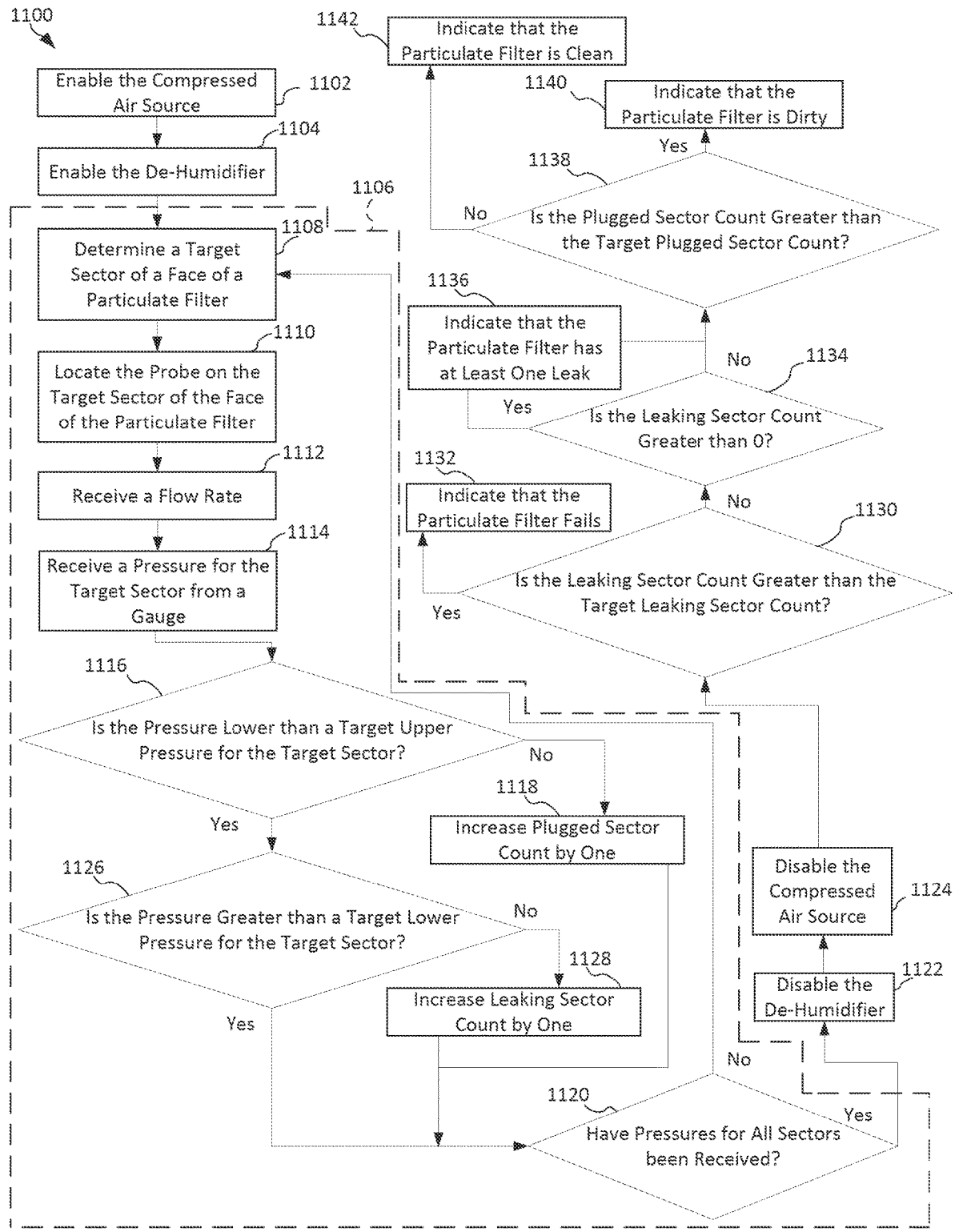
FIG. 11 is a block diagram of an example testing process implemented by the example particulate filter inspection system of FIG. 7.

FIG. 11 illustrates a testing process 1100 for using the particulate filter inspection system 700. When the testing process 1100 is performed, the particulate filter inspection system 700 is in the testing configuration and not in the calibration configuration. The testing process 1100 begins in block 1102 with commanding, by the controller 708, the compressed air source 704 to be enabled (e.g., turned on, etc.) such that the compressed air source 704 draws air from the air source 706. When the controller 708 enables the compressed air source 704, the compressed air source 704 is set to a target compressed air source pressure by the controller 708 (e.g., a pressure that the compressed air source 704 is working to compress air to, etc.). The target compressed air source pressure may be entered by a user (e.g., via a user interface electronically coupled to or electrically communicable with the controller 708, etc.) and may be a function of the particulate filter 702. For example, a user may enter a model number of the particulate filter 702 into a user interface electronically coupled to the controller 708, the controller 708 may determine a target compressed air source pressure associated with the particulate filter 702 based on the model number, and the controller 708 may command the compressed air source 704 to provide air into the primary conduit 712 at the target compressed air source pressure.

The testing process 1100 continues in block 1104 with commanding, by the controller 708, the de-humidifier 714 to be enabled such that the de-humidifier 714 functions to remove water and/or oil from the air received from the compressed air source 704. In some embodiments, block 1104 occurs prior to block 1102 such that the de-humidifier 714 can be "warmed-up" prior to the de-humidifier 714 receiving air from the compressed air source 704.

The testing process 1100 includes a pressure collection process 1106. The pressure collection process 1106 is performed for each of the sectors 746 on a face 744 of the particulate filter 702. For example, if the face 744 of the particulate filter 702 has twenty-five sectors 746, the pressure collection process 1106 is performed twenty-five times.

The pressure collection process 1106 includes in block 1108 determining, by the controller 708, a target sector 746 on the face 744 of the particulate filter 702. The target sector 746 may be determined based on a sector 746 for which the pressure collection process 1106 was previously performed or will be subsequently performed. For example, the pressure collection process 1106 may be repeated with sectors 746 selected in a patterned or organized fashion (e.g., in a clockwise direction, in a counter-clockwise direction, by snaking through a series of rows and columns of sectors 746, etc.).

The pressure collection process 1106 continues in block 1110 with locating, by a user, the probe 736 over the target sector 746 on the face 744 of the particulate filter 702. For example, the probe 736 may be located on a second sector 746 of the face 744 of the particulate filter 702. To locate the probe 736 over the target sector 746 on the face 744 of the particulate filter 702, the user may simply lift the probe 736 and place the probe 736 down on the face 744 over the target sector 746.

The pressure collection process 1106 continues in block 1112 with receiving, by the controller 708, a flow rate (e.g., a mass flow rate from the mass flow meter 734, a volumetric flow rate from the volumetric flow rate measurement system 752, etc.). The controller 708 subsequently stores the flow rate associated with the target sector 746 in the memory 710 (e.g., via indexing, etc.). The flow rate may be utilized by the processor 709 for reference purposes.

The pressure collection process 1106 continues in block 1114 with receiving, by the controller 708, a pressure for the target sector 746 from the gauge 740. For example, the controller 708 may receive a pressure of 5.5 psi from the gauge 740 for the target sector 746. The controller 708 subsequently stores the pressure associated with the target sector 746 in the memory 710.

The pressure collection process 1106 continues in block 1116 with determining, by the controller 708, if the pressure received from the gauge 740 for the target sector 746 is lower than a target upper pressure. The target upper pressure may be associated with the target sector 746 or the particulate filter 702 as a whole. For example, the target upper pressure may be 5 psi. The target upper pressure is stored in the memory 710. In some embodiments, the target upper pressure is determined by the controller 708 (e.g., based on the flow rate, based on the pressure of the air output by the compressed air source 704, via machine learning, etc.).

If in block 1116, it is determined the pressure for the target sector 746 is not lower than the target upper pressure for the target sector (e.g., the pressure for the target sector 746 is greater than the target upper pressure, the pressure for the target sector 746 is equal to the target upper pressure), then the pressure collection process 1106 continues in block 1118 with increasing, by the controller 708, a plugged sector count stored within the memory 710. The plugged sector count indicates the raw number of sectors 746 that have pressures which are not lower than (e.g., are greater than) their associated target upper pressures. When the pressure of a sector 746 is not lower than a target upper pressure for the sector 746, the level of particulates within the sector 746 is greater than a target level of particulates for the sector 746. The pressure collection process 1106 continues in block 1120 with determining, by the controller 708, if pressures for all sectors 746 have been received by the controller 708. For example, the processor 709 may query the memory 710 to ensure that all of the sectors 746 are associated with a pressure. If pressures for all of the sectors 746 have been received, the pressure collection process 1106 ends and the testing process 1100 continues in block 1122 with commanding, by the controller 708, the de-humidifier 714 to be disabled such that the de-humidifier 714 ceases to function to remove water and/or oil from the air received from the compressed air source 704. The testing process 1100 then continues in block 1124 with commanding, by the controller 708, the compressed air source 704 to be disabled. In some embodiments, block 1124 occurs prior to block 1122.

If it is determined in block 1116 that the pressure received from the gauge 740 is lower than the target upper pressure, the pressure collection process 1106 skips block 1118 and the plugged sector count is not increased. Instead, the pressure collection process 1106 continues in block 1126 with determining, by the controller 708, if the pressure received from the gauge 740 for the target sector 746 is greater than a target lower pressure (e.g., is not lower than the target lower pressure, is not equal to the target lower pressure, etc.). The target lower pressure may be associated with the target sector 746 or the particulate filter 702 as a whole. For example, the target lower pressure may be 2 psi. The target lower pressure is stored in the memory 710. In some embodiments, the target lower pressure is determined by the controller 708 (e.g., based on the flow rate, based on the pressure of the air output by the compressed air source 704, via machine learning, etc.).

If in block 1126, it is determined the pressure for the target sector 746 is greater than the target lower pressure for the target sector, then the pressure collection process 1106 continues with block 1120. However, if in block 1126, it is determined the pressure for the target sector 746 is not greater than the target lower pressure for the target sector (e.g., the pressure for the target sector 746 is lower than the target lower pressure, the pressure for the target sector 746 is equal to the target lower pressure), then the pressure collection process 1106 continues in block 1128 with increasing, by the controller 708, a leaking sector count stored within the memory 710.

After block 1124, the testing process 1100 then continues in block 1130 with determining, by the controller 708, if the leaking sector count is greater than a target leaking sector count. In other words, the controller 708 determines if more sectors 746 than desired have pressures that are not greater than their associated target lower pressures. If the leaking sector count is greater than the target leaking sector count, the testing process 1100 continues in block 1132 with indicating, by the controller 708, that the particulate filter 702 fails (e.g., does not pass, etc.) the testing process 1100 and the testing process 1100 subsequently ends. The controller 708 may indicate that the particulate filter 702 fails the testing process 1100 by, for example, illuminating a light proximate the user, displaying text or an image on a graphical user interface, and other similar mechanisms. Additionally, the indication may convey the at least one sector 746 that had a pressure that was not greater than its associated target lower pressure, so as to facilitate inspection of the at least one sector 746, specifically.

If the leaking sector count is not greater than the target leaking sector count, the testing process 1100 continues in block 1134 with determining, by the controller 708, if the leaking sector count is greater than a target leaking sector count, such as 0. In other words, the controller 708 determines any sectors 746 have pressures that are not greater than their associated target lower pressures. If the leaking sector count is greater than 0, the testing process 1100 continues in block 1136 with indicating, by the controller 708, that the particulate filter 702 has at least one leak. The controller 708 may indicate that the particulate filter 702 has at least one leak by, for example, illuminating a light proximate the user, displaying text or an image on a graphical user interface, and other similar mechanisms. Additionally, the indication may convey the at least one sector 746 that had a pressure that was not greater than its associated target lower pressure, so as to facilitate inspection of the at least one sector 746, specifically.

Regardless of whether the particulate filter 702 has any leaks, the testing process 1100 continues in block 1138 with determining, by the controller 708, if the plugged sector count is greater than a target plugged sector count. In other words, the controller 708 determines if more sectors 746 than desired have pressures that are greater than their associated target upper pressures. If the plugged sector count is greater than the target plugged sector count, the testing process 1100 continues in block 1140 with indicating, by the controller 708, that the particulate filter 702 is dirty (e.g., did not pass the testing process 1100, etc.) and the testing process 1100 subsequently ends. The controller 708 may indicate that the particulate filter 702 is dirty by, for example, illuminating a light proximate the user, displaying text or an image on a graphical user interface, and other similar mechanisms. Additionally, the indication may convey the at least one sector 746 that had a pressure greater than its associated target upper pressure, so as to facilitate cleaning of the at least one sector 746, specifically.

If the plugged sector count is not greater than the target plugged sector count, the testing process 1100 continues in block 1142 with indicating, by the controller 708, that the particulate filter 702 is clean (e.g., passed the testing process 1100, etc.) and the testing process 1100 subsequently ends. The controller 708 may indicate that the particulate filter 702 is clean by, for example, illuminating a light proximate the user, displaying text or an image on a graphical user interface, and other similar mechanisms. Even if the controller 708 indicates that the particulate filter 702 is clean, the indication may still convey any sectors 746 that had a pressure greater than its associated target upper pressure, so as to facilitate cleaning of those sectors 746, specifically, or to facilitate estimation of a remaining service life of the particulate filter 702 (e.g., an amount of time left before the particulate filter 702 will require cleaning, etc.).

If it is determined in block 1120 that pressures from all sectors 746 have not been received, the pressure collection process 1106 continues with block 1108 (i.e., skipping blocks 1122, 1124, 1130, 1132, 1134, 1136, 1138, 1140, and 1142).

It is understood that in some embodiments, the testing process 1100 does not include blocks 1134 or 1136. In these embodiments, the testing process 1100 is capable of indicating that the particulate filter 702 has failed but is not capable of indicating that the particulate filter 702 has at least one leak. In these embodiments, the testing process 1100 may, or may not, indicate that the particulate filter 702 is clean or dirty (e.g., the testing process 1100 may or may not include blocks 1138, 1140, and 1142, etc.). Such embodiments may be advantageous where the number of sectors 746 is large and/or when some leaking of the particulate filter 702 is permissible (e.g., is within specification, etc.).

Similarly, it is also understood that in some embodiments, the testing process 1100 does not include blocks 1130 or 1132. In these embodiments, the testing process 1100 is capable of indicating that the particulate filter 702 has at least one leak but is not capable of indicating that the particulate filter 702 has failed. In these embodiments, the testing process 1100 may, or may not, indicate that the particulate filter 702 is clean or dirty (e.g., the testing process 1100 may or may not include blocks 1138, 1140, and 1142, etc.). Such embodiments may be advantageous where the any leak in the particulate filter 702 is considered a failure of the particulate filter 702 (e.g., critical applications, military applications, etc.).

Figure 12:
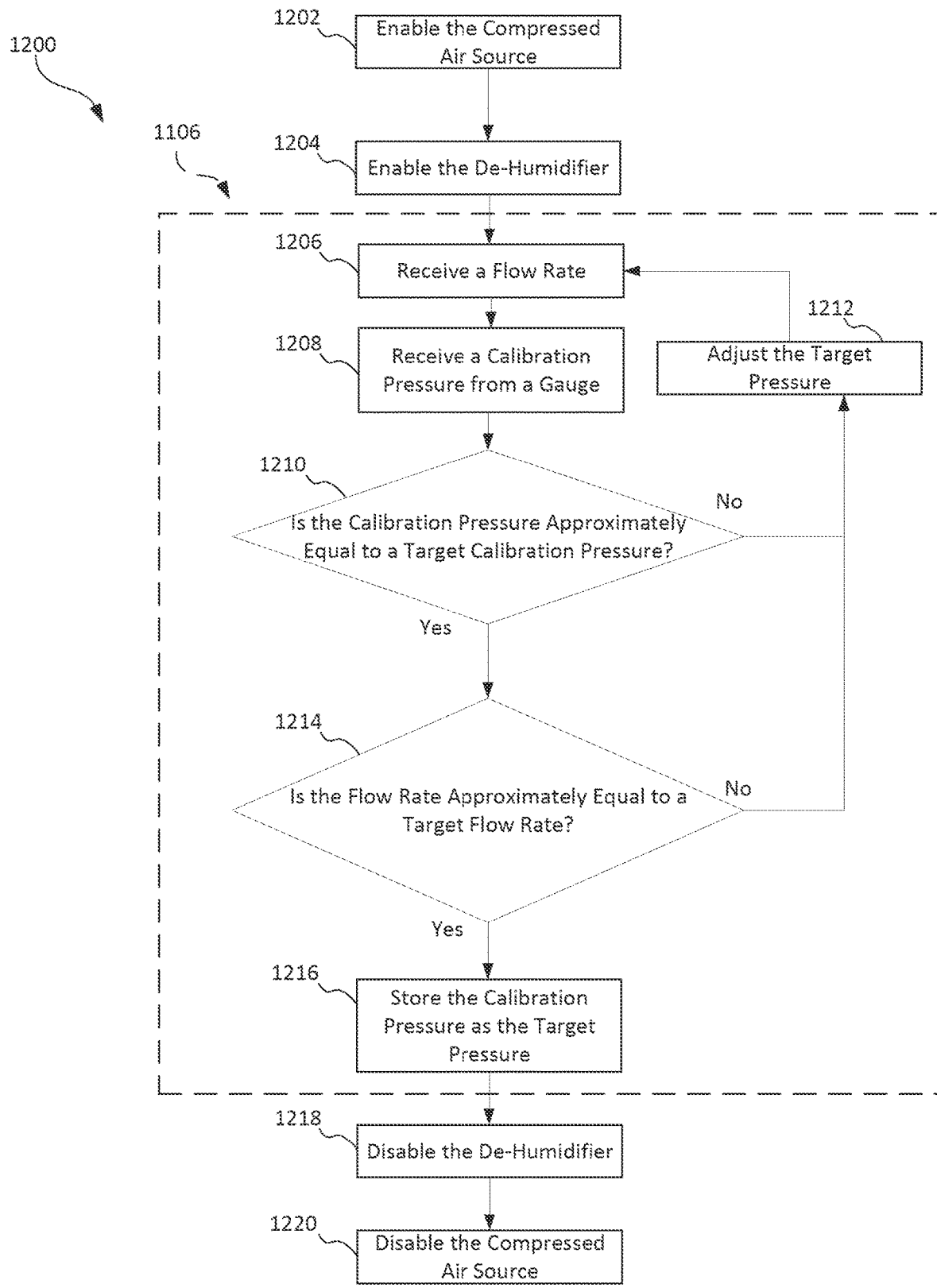
FIG. 12 is a block diagram of an example calibration process implemented by the example particulate filter inspection system of FIG. 7.

FIG. 12 illustrates a calibration process 1200 for using the particulate filter inspection system 700. When the calibration process 1200 is performed, the particulate filter inspection system 700 is in the calibration configuration and not in the testing configuration. The calibration process 1200 begins in block 1202 with commanding, by the controller 708, the compressed air source 704 to be enabled (e.g., turned on, etc.) such that the compressed air source 704 draws air from the air source 706. When the controller 708 enables the compressed air source 704, the compressed air source 704 is set to a target compressed air source pressure by the controller 708 (e.g., a pressure that the compressed air source 704 is working to compress air to, etc.). The target compressed air source pressure may be entered by a user (e.g., via a user interface electronically coupled to or electrically communicable with the controller 708, etc.) and may be a function of the particulate filter 702. For example, a user may enter a model number of the particulate filter 702 into a user interface electronically coupled to the controller 708, the controller 708 may determine a target compressed air source pressure associated with the particulate filter 702 based on the model number, and the controller 708 may command the compressed air source 704 to provide air into the primary conduit 712 at the target compressed air source pressure.

The calibration process 1200 continues in block 1204 with commanding, by the controller 708, the de-humidifier 714 to be enabled such that the de-humidifier 714 functions to remove water and/or oil from the air received from the compressed air source 704. In some embodiments, block 1204 occurs prior to block 1202 such that the de-humidifier 714 can be "warmed-up" prior to the de-humidifier 714 receiving air from the compressed air source 704.

The calibration process 1200 continues in block 1206 with receiving, by the controller 708, a flow rate (e.g., a mass flow rate from the mass flow meter 734, a volumetric flow rate from the volumetric flow rate measurement system 752, etc.). The controller 708 subsequently stores the flow rate in the memory 710. The flow rate may be utilized by the processor 709 for reference purposes.

The calibration process 1200 continues in block 1208 with receiving, by the controller 708, a calibration pressure from the gauge 740. Unlike the testing process 1100, the calibration pressure received in the calibration process 1200 may be for more than one sector 746 due to the orifice plate 748. For example, the controller 708 may receive a calibration pressure of 4.5 psi from the gauge 740. The controller 708 subsequently stores the calibration pressure in the memory 710.

The calibration process 1200 continues in block 1210 with determining, by the controller 708, if the calibration pressure received from the gauge 740 is approximately equal to (e.g., within 5% of, etc.) a target calibration pressure. The target calibration pressure may be associated with the particulate filter 702.

If the calibration pressure is not approximately equal to the target calibration pressure, then the calibration process 1200 continues in block 1212 with adjusting (e.g., increasing, decreasing, etc.), by the controller 708, the target compressed air source pressure of the compressed air source 704. The calibration process 1200 then continues with block 1206.

If it is determined in block 1210 that the calibration pressure is approximately equal to the target calibration pressure, then the calibration process 1200 continues in block 1214 with determining, by the controller 708, if the flow rate is approximately equal to (e.g., within 5% of, etc.) a target flow rate. The target flow rate may be associated with the particulate filter 702. If it is determined in block 1214 that the flow rate is not approximately equal to the target flow rate, then the calibration process 1200 continues with block 1212.

If it is determined in block 1214 that the flow rate is approximately equal to the target flow rate, then the calibration process continues with in block 1216 storing, by the controller 708, the calibration pressure as the target upper pressure in the memory 710. The target upper pressure may be utilized when the testing process 1100 is implemented. The calibration process 1200 continues in block 1218 with commanding, by the controller 708, the de-humidifier 714 to be disabled such that the de-humidifier 714 ceases to function to remove water and/or oil from the air received from the compressed air source 704. The calibration process 1200 then continues in block 1220 with commanding, by the controller 708, the compressed air source 704 to be disabled. In some embodiments, block 1220 occurs prior to block 1218.

VI. Example Probe for a Particulate Filter Inspection System

Figure 13:
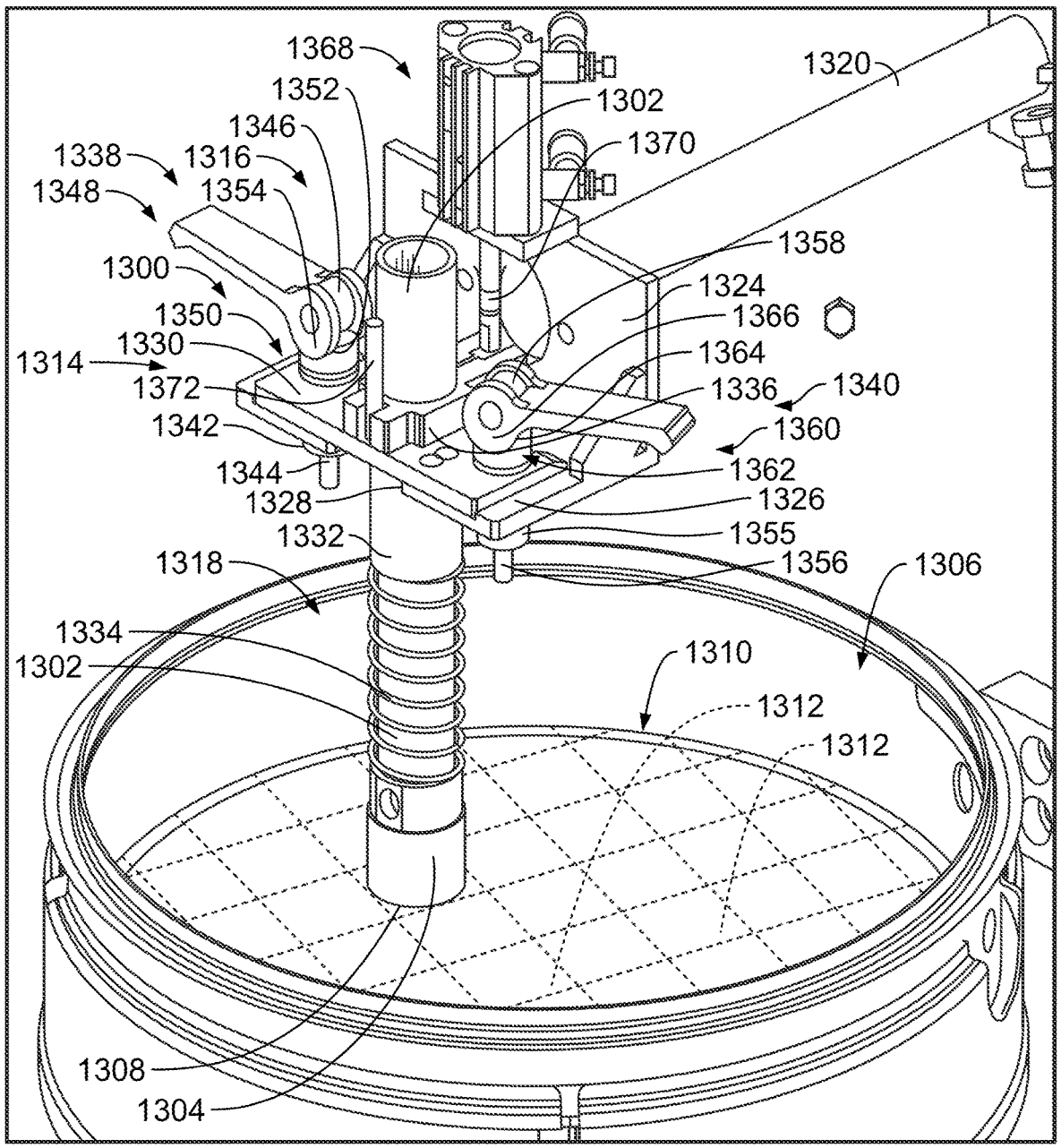
FIG. 13 is a detailed view of an example probe for a particulate filter inspection system.

FIG. 13 depicts a probe 1300 according to an example embodiment. The probe 1300 is utilized within a particulate filter inspection system, such as the particulate filter inspection system 100 and the particulate filter inspection system 700. The probe 1300 includes an insertion portion 1302. The insertion portion 1302 is configured to be received within a primary conduit of a particulate filter inspection system, such as the primary conduit 112 and the primary conduit 712. The probe 1300 is configured to receive air from a compressed air source, such as the compressed air source 104 or the compressed air source 704, via the primary conduit.

The probe 1300 also includes an interfacing portion 1304 that is configured to provide the air received from the primary conduit to a particulate filter 1306. The probe 1300 also includes a seal member 1308 (e.g., gasket, bushing, etc.). The seal member 1308 is coupled to the interfacing portion 1304. For example, the seal member 1308 may be pressed into the interfacing portion 1304. The seal member 1308 may additionally or alternatively be adhesively attached (e.g., affixed, coupled, etc.) to the interfacing portion 1304 (e.g., using adhesive, using glue, etc.). In various embodiments, the seal member 1308 is an x-ring (e.g., an o-ring with an "x" shaped profile, etc.). In an example embodiment, the seal member 1308 has a hardness of Shore 70A.

The seal member 1308 is configured to be placed on a face 1310 of the particulate filter 1306 and to be selectively positioned at various discrete locations along the face 1310 of the particulate filter 1306. In this way, a particulate filter inspection system, such as the particulate filter inspection system 100 and the particulate filter inspection system 700, using the probe 1300 can determine a localized pressure of flow through the particulate filter 1306 at each location based on a determined pressure. These localized pressures may then, for example, be utilized to determine a level of particulates within the particulate filter 1306.

The face 1310 of the particulate filter 1306 is sectored into a plurality (e.g., two, three, four, five, six, seven, eight, nine, ten, fifteen, twenty, twenty-five, thirty, etc.) of sectors 1312, each sector having an area (e.g., surface area, etc.) that is greater than or equal to an area (e.g., surface area, etc.) of the interfacing portion 1304 and/or an area (e.g., surface area, etc.) bordered (e.g., circumscribed, enclosed, etc.) by the seal member 1308. In this way, the interfacing portion 1304 and/or the seal member 1308 does not extend off of the face 1310 or onto an adjacent sector 1312 when the probe 1300 is placed on a sector 1312. When the probe 1300 is placed on a sector 1312, the interfacing portion 1304 and/or the seal member 1308 may be centered on the sector 1312. In an example embodiment, the face 1310 is sectored into twenty-five sectors 1312. It is understood that the face 1310 of the particulate filter 1306 could be sectored into any number of sectors 1312 such that the particulate filter inspection system is tailored for a target application.

The probe 1300 also includes a frame assembly 1314 (e.g., body, etc.). The frame assembly 1314 includes a base assembly 1316 and a nozzle assembly 1318. The base assembly 1316 includes an arm 1320. The arm 1320 is configured to be articulated (e.g., rotated, lifted, lowered, etc.) to cause the probe 1300 to be placed on a target sector 1312. For example, the arm 1320 may be articulated by a user (e.g., by hand, etc.) or a machine. The base assembly 1316 also includes a first base assembly plate 1324 (e.g., vertical panel, etc.). The first base assembly plate 1324 is coupled to the arm 1320. The base assembly 1316 also includes a second base assembly plate 1326 (e.g., horizontal panel, etc.). The second base assembly plate 1326 is coupled to the first base assembly plate 1324 and separated from the arm 1320 by the first base assembly plate 1324. In various embodiments, the second base assembly plate 1326 is disposed along a plane that is orthogonal to a plane upon which the first base assembly plate 1324 is disposed. The second base assembly plate 1326 includes a base assembly slot 1328 and at least one base assembly aperture. In an example embodiment, the second base assembly plate 1326 includes two base assembly apertures and the base assembly slot 1328 is located between the two base assembly apertures.

The nozzle assembly 1318 includes a nozzle plate 1330. The nozzle plate 1330 includes a nozzle plate aperture that is configured to receive the insertion portion 1302 such that the insertion portion 1302 is moveable within the nozzle plate aperture. The nozzle assembly 1318 also includes a sleeve 1332. The sleeve 1332 is coupled to the nozzle plate 1330 and configured to receive the insertion portion 1302 such that the insertion portion 1302 is moveable within the nozzle plate aperture. The sleeve 1332 separates the interfacing portion 1304 from the nozzle plate 1330. The base assembly slot 1328 is configured to receive the sleeve 1332 such that the nozzle plate 1330 is disposed adjacent the second base assembly plate 1326. The nozzle plate 1330 also includes at least one nozzle plate slot. In an example embodiment, the nozzle plate 1330 includes two nozzle plate slots and the nozzle plate aperture is located between the two nozzle plate slots.

The nozzle assembly 1318 also includes a biasing member 1334 (e.g., coil spring, etc.). The biasing member 1334 extends between the interfacing portion 1304 and the sleeve 1332. The biasing member 1334 variously biases the interfacing portion 1304 and the nozzle plate 1330 towards each other and away from each other. As a result, the biasing member 1334 may resist movement of the sleeve 1332, and therefore the nozzle plate 1330, towards the face 1310 when the seal member 1308 is pressed against the face 1310. Additionally, the biasing member 1334 may bias the seal member 1308 against the face 1310 in such a situation, thereby increasing sealing between the seal member 1308 and the face 1310 and enhancing accuracy of a determined localized pressure of flow through the particulate filter 1306.

The nozzle assembly 1318 also includes a coupling 1336. The coupling 1336 is located over the nozzle plate aperture and disposed about the insertion portion 1302 such that the coupling 1336 is not moveable with respect to the insertion portion 1302. The coupling 1336 is not coupled to the nozzle plate 1330. As a result, the coupling 1336 is moveable with respect to the nozzle plate 1330 (e.g., as the insertion portion 1302 moves within the nozzle plate aperture). The nozzle plate 1330 is located between the coupling 1336 and the sleeve 1332.

The base assembly 1316 also includes a first disconnect 1338 (e.g., clamp, quick disconnect, etc.) and a second disconnect 1340 (e.g., clamp, quick disconnect, etc.). The first disconnect 1338 includes a first disconnect lower body 1342. The first disconnect lower body 1342 is aligned with a base assembly aperture and is coupled or integrated within the second base assembly plate 1326 opposite the first base assembly plate 1324. As a result, the second base assembly plate 1326 separates the first disconnect lower body 1342 from the nozzle plate 1330 when the nozzle plate 1330 is coupled to the second base assembly plate 1326, as described in more detail herein.

The first disconnect 1338 also includes a first disconnect shaft 1344 is coupled to the first disconnect lower body 1342 such that the first disconnect shaft 1344 is not moveable within the first disconnect lower body 1342. The first disconnect 1338 also includes a first disconnect pivot end 1346. The first disconnect pivot end 1346 is coupled to the first disconnect shaft 1344 and is separated from the first disconnect lower body 1342 by the second base assembly plate 1326. The first disconnect pivot end 1346 is not moveable with respect to the first disconnect shaft 1344. The first disconnect 1338 also includes a first disconnect handle 1348. The first disconnect handle 1348 is rotatably coupled to the first disconnect pivot end 1346.

The first disconnect 1338 also includes a first disconnect upper body 1350. The first disconnect upper body 1350 is separated from the first disconnect lower body 1342 by the second base assembly plate 1326. The first disconnect upper body 1350 includes a first disconnect upper body aperture through which the first disconnect shaft 1344 extends such that the first disconnect shaft 1344 is moveable within the first disconnect upper body 1350. As a result, the first disconnect upper body 1350 is moveable with respect to the first disconnect pivot end 1346 and the first disconnect handle 1348.

The first disconnect upper body 1350 includes a first disconnect upper body receiver 1352. The first disconnect upper body receiver 1352 is configured to receive a first disconnect handle cam 1354. The first disconnect handle cam 1354 is configured to rotate within the first disconnect upper body receiver 1352 upon rotation of the first disconnect handle 1348. The first disconnect handle cam 1354 and/or the first disconnect upper body receiver 1352 are configured such that a distance between the first disconnect pivot end 1346 and the first disconnect upper body 1350 varies as the first disconnect handle 1348 is rotated.

The second disconnect 1340 includes a second disconnect lower body 1355. The second disconnect lower body 1355 is aligned with a base assembly aperture and is coupled or integrated within the second base assembly plate 1326 opposite the first base assembly plate 1324. As a result, the second base assembly plate 1326 separates the second disconnect lower body 1355 from the nozzle plate 1330 when the nozzle plate 1330 is coupled to the second base assembly plate 1326, as described in more detail herein.

The second disconnect 1340 also includes a second disconnect shaft 1356 is coupled to the second disconnect lower body 1355 such that the second disconnect shaft 1356 is not moveable within the second disconnect lower body 1355. The second disconnect 1340 also includes a second disconnect pivot end 1358. The second disconnect pivot end 1358 is coupled to the second disconnect shaft 1356 and is separated from the second disconnect lower body 1355 by the second base assembly plate 1326. The second disconnect pivot end 1358 is not moveable with respect to the second disconnect shaft 1356. The second disconnect 1340 also includes a second disconnect handle 1360. The second disconnect handle 1360 is rotatably coupled to the second disconnect pivot end 1358.

The second disconnect 1340 also includes a second disconnect upper body 1362. The second disconnect upper body 1362 is separated from the second disconnect lower body 1355 by the second base assembly plate 1326. The second disconnect upper body 1362 includes a second disconnect upper body aperture through which the second disconnect shaft 1356 extends such that the second disconnect shaft 1356 is moveable within the second disconnect upper body 1362. As a result, the second disconnect upper body 1362 is moveable with respect to the second disconnect pivot end 1358 and the second disconnect handle 1360.

The second disconnect upper body 1362 includes a second disconnect upper body receiver 1364. The second disconnect upper body receiver 1364 is configured to receive a second disconnect handle cam 1366. The second disconnect handle cam 1366 is configured to rotate within the second disconnect upper body receiver 1364 upon rotation of the second disconnect handle 1360. The second disconnect handle cam 1366 and/or the second disconnect upper body receiver 1364 are configured such that a distance between the second disconnect pivot end 1358 and the second disconnect upper body 1362 varies as the second disconnect handle 1360 is rotated.

When the nozzle assembly 1318 is not coupled to the base assembly 1316, the coupling 1336 is separated from the sleeve 1332, and therefore the biasing member 1334, by the nozzle plate 1330. The coupling 1336, the interfacing portion 1304, and the seal member 1308 are not moveable with respect to the insertion portion 1302. However, the sleeve 1332 and the nozzle plate 1330 are movable with respect to the insertion portion 1302. The biasing member 1334 is retained between the interfacing portion 1304 and the sleeve 1332.

To couple the nozzle assembly 1318 to the base assembly 1316, the sleeve 1332 is inserted through the base assembly plate slot 1328 and the second base assembly plate 1330 is placed on the second base assembly plate 1326 and pushed towards the first base assembly plate 1324 such that the first disconnect shaft 1344 and the second disconnect shaft 1356 are each received within a nozzle plate slot, the first disconnect upper body 1350 is separated from the second base assembly plate 1326 by the nozzle plate 1330, and the second disconnect upper body 1362 is separated from the second base assembly plate 1326 by the nozzle plate 1330. The first disconnect handle 1348 and the second disconnect handle 1360 are then rotated such that the first disconnect upper body 1350 is biased against the nozzle plate 1330 due to the interaction of the first disconnect handle cam 1354 and the first disconnect upper body receiver 1352 and such that the second disconnect upper body 1362 is biased against the nozzle plate 1330 due to the interaction of the second disconnect handle cam 1366 and the second disconnect upper body receiver 1364. To decouple the nozzle assembly 1318 from the base assembly 1316, the first disconnect handle 1348 and the second disconnect handle 1360 are rotated such that the first disconnect upper body 1350 and the second disconnect upper body 1362 do not bias the nozzle plate 1330 against the second base assembly plate 1326.

The base assembly 1316 also includes an actuator 1368 (e.g., pneumatic piston, linear actuator, solenoid, etc.). The actuator 1368 is coupled to the first base assembly plate 1324. The actuator 1368 includes an actuator shaft 1370 and is operable to selectively reposition to actuator shaft 1370. The actuator shaft 1370 is configured to be received within the coupling 1336 when the nozzle assembly 1318 is coupled to the base assembly 1316 such that movement of the actuator shaft 1370 is transferred to the coupling 1336. For example, the actuator shaft 1370 may include a prong (e.g., a T-shaped prong, etc.) that is received within a corresponding recess (e.g., a T-shaped recess, etc.) in the coupling 1336. By selectively repositioning the coupling 1336, the actuator 1368 may cause the interfacing portion 1304 to be repositioned. This may facilitate lifting of the interfacing portion 1304 from the face 1310 or pressing of the interfacing portion 1304 against the face 1310.

The nozzle assembly 1318 also includes a guide 1372. The guide 1372 is coupled to the nozzle plate 1330. The coupling 1336 includes a guide aperture that is configured to receive the guide 1372. The coupling 1336 is moveable with respect to the guide 1372. However, the guide 1372 functions to guide movement of the coupling 1336 with respect to the nozzle plate 1330. For example, an interaction between the guide 1372 and the coupling 1336 may constrain the coupling 1336 to movement in a single direction (e.g., vertical direction, etc.) with respect to the nozzle plate 1330.

In an example operation, the nozzle assembly 1318 is coupled to the base assembly 1316 and the arm 1320 is utilized to locate the interfacing portion 1304 over a target sector 1312 on the face 1310. The actuator 1368 is then caused (e.g., by a controller similar to the controller 108, by a controller similar to the controller 708, etc.) to reposition the actuator shaft 1370 such that the coupling 1336, and therefore the interfacing portion 1304, is lowered. A localized pressure of flow through the target sector 1312 is determined, and then the actuator 1368 is caused to reposition the actuator shaft 1370 such that the coupling 1336, and therefore the interfacing portion 1304, is raised. This process may then be repeated for any of the sectors 1312.

VII. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "approximately," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language a "portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

What is claimed is:

1. A particulate filter inspection system for a particulate filter, the particulate filter inspection system comprising:
   a compressed air source configured to draw air from an air source;
   a primary conduit configured to receive the air from the compressed air source;
   a probe coupled to the primary conduit, the probe configured to interface with a face of the particulate filter to provide the air to only a sector of the particulate filter;
   a gauge configured to determine a pressure of the air within the primary conduit when the probe is providing the air to only a sector of the face of the particulate filter; and
   a controller communicable with the probe, the controller configured to:
      compare the pressure to a target upper pressure, and
      increase a plugged sector count when the pressure is not lower than the target upper pressure.

2. The particulate filter inspection system of claim 1, wherein the controller is further configured to:
   compare the plugged sector count to a target plugged sector count, and
   provide an indication that the particulate filter is dirty when the plugged sector count is greater than the target plugged sector count.

3. The particulate filter inspection system of claim 1, further comprising an orifice plate configured to be selectively coupled to the probe, the orifice plate configured to interface with the particulate filter and to separate the probe from the particulate filter when the orifice plate interfaces with the particulate filter.

4. The particulate filter inspection system of claim 3, wherein the gauge is further configured to facilitate determining of a calibration pressure of the air within the primary conduit when the probe is not providing the air to only a sector of the face of the particulate filter and when the orifice plate is coupled to the probe and interfaces with the particulate filter.

5. The particulate filter inspection system of claim 4, wherein:
   the compressed air source is further configured to provide the air into the primary conduit at a target compressed air source pressure; and
   the controller is further configured to:
      compare the calibration pressure to a target calibration pressure when the orifice plate is coupled to the probe and interfaces with the particulate filter, and
      selectively adjust the target compressed air source pressure based on the comparison between the calibration pressure and the target calibration pressure.

6. The particulate filter inspection system of claim 5, further comprising a mass flow meter positioned along the primary conduit and configured to facilitate determination of a flow rate of the air flowing through the primary conduit.

7. The particulate filter inspection system of claim 6, wherein the controller is further configured to:
   compare the flow rate to a target flow rate when the orifice plate is coupled to the probe and interfaces with the particulate filter; and
   selectively adjust the target compressed air source pressure based on the comparison between the flow rate and the target flow rate.

8. The particulate filter inspection system of claim 1, wherein the controller is further configured to:
   compare the pressure to a target lower pressure; and
   provide an indication that the particulate filter has a leak or fails a test if the pressure is not greater than the target lower pressure.

9. The particulate filter inspection system of claim 1, wherein the probe comprises a seal member that is configured to interface with the face of the particulate filter and to establish a seal between the probe and the face of the particulate filter.

10. A particulate filter inspection system for a particulate filter, the particulate filter inspection system comprising:
a compressed air source configured to draw air from an air source;
a primary conduit configured to receive the air from the compressed air source;
a probe coupled to the primary conduit, the probe configured to interface with a face of the particulate filter to provide the air to only a sector of the particulate filter;
a gauge coupled to the probe, the gauge configured to determine a pressure of the air within the probe when the probe is providing the air to only a sector of the face of the particulate filter;
an auxiliary conduit coupled to the gauge and the probe, the auxiliary conduit separating the gauge from the probe;
a controller communicable with the probe, the controller configured to:
compare the pressure to a target upper pressure, and increase a plugged sector count when the pressure is not lower than the target upper pressure.

11. The particulate filter inspection system of claim 10, wherein the controller is further configured to:
compare the plugged sector count to a target plugged sector count, and
provide an indication that the particulate filter is dirty when the plugged sector count is greater than the target plugged sector count.

12. The particulate filter inspection system of claim 10, wherein the controller is further configured to:
compare the pressure to a target lower pressure; and
provide an indication that the particulate filter has a leak or fails a test if the pressure is not greater than the target lower pressure.

13. The particulate filter inspection system of claim 10, further comprising an upstream gauge upstream of a pressure regulator, the upstream gauge communicable with the controller and configured to facilitate determination of a pressure of the air within the primary conduit upstream of the gauge.

14. The particulate filter inspection system of claim 10, further comprising:
an upstream gauge communicable with the controller and configured to facilitate determination of a pressure of the air within the primary conduit upstream of the gauge; and
a pressure regulator downstream of the upstream gauge, the pressure regulator communicable with the controller and coupled to the primary conduit between the upstream gauge and the gauge, the pressure regulator defined by a target pressure regulator pressure;
wherein the controller is configured to adjust the target pressure regulator pressure based on at least one of the pressure received from the upstream gauge or the pressure received from the gauge.

15. The particulate filter inspection system of claim 13, further comprising a de-humidifier communicable with the controller and coupled to the primary conduit downstream of the compressed air source and upstream of the probe;
wherein the controller is configured to control operation of the de-humidifier based on the pressure received from the gauge.

16. The particulate filter inspection system of claim 10, wherein the probe comprises a seal member that is configured to interface with the face of the particulate filter and to establish a seal between the probe and the face of the particulate filter.

17. A particulate filter inspection system for a particulate filter, the particulate filter inspection system comprising:
a primary conduit configured to receive air;
a probe coupled to the primary conduit, the probe configured to interface with a face of the particulate filter to provide the air to only a sector of the particulate filter;
a gauge configured to determine a pressure of the air within the primary conduit when the probe is providing the air to only a sector of the face of the particulate filter; and
a controller communicable with the probe, the controller configured to:
compare the pressure to a target upper pressure,
increase a plugged sector count when the pressure is not lower than the target upper pressure,
compare the plugged sector count to a target plugged sector count, and
provide an indication that the particulate filter is dirty when the plugged sector count is greater than the target plugged sector count.

18. The particulate filter inspection system of claim 17, further comprising an orifice plate configured to be selectively coupled to the probe, the orifice plate configured to interface with the particulate filter and to separate the probe from the particulate filter when the orifice plate interfaces with the particulate filter.

19. The particulate filter inspection system of claim 17, wherein the controller is further configured to:
compare the pressure to a target lower pressure; and
provide an indication that the particulate filter has a leak or fails a test if the pressure is not greater than the target lower pressure.

20. The particulate filter inspection system of claim 17, wherein the probe comprises a seal member configured to interface with the face of the particulate filter and to establish a seal between the probe and the face of the particulate filter.

* * * * *